US012694146B2

(12) United States Patent
Berger et al.

(10) Patent No.: US 12,694,146 B2
(45) Date of Patent: Jul. 28, 2026

(54) MULTI-MODAL QUERIES IN A DIGITAL CYBERSECURITY SYSTEMS

(71) Applicant: CrowdStrike, Inc., Sunnyvale, CA (US)

(72) Inventors: Timothy Jason Berger, Eastvale, CA (US); Marcus Andrew King, Louisville, KY (US); Thomas Francis Lyons, Irvine, CA (US); Brent Ryan Nash, Irvine, CA (US); James Robert Plush, Coto De Caza, CA (US)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/910,112

(22) Filed: Oct. 9, 2024

(65) Prior Publication Data

US 2026/0099617 A1 Apr. 9, 2026

(51) Int. Cl.
*G06F 21/62* (2013.01)
*G06F 16/2455* (2019.01)

(52) U.S. Cl.
CPC ...... *G06F 21/6218* (2013.01); *G06F 16/2455* (2019.01)

(58) Field of Classification Search
None
See application file for complete search history.

(56) References Cited

U.S. PATENT DOCUMENTS

| | | | |
|---|---|---|---|
| 7,146,352 | B2 | 12/2006 | Brundage et al. |
| 7,840,501 | B1 | 11/2010 | Sallam |

| | | | |
|---|---|---|---|
| 8,779,921 | B1 | 7/2014 | Curtiss |
| 9,043,903 | B2 | 5/2015 | Diehl et al. |
| 9,069,930 | B1 | 6/2015 | Hart |
| 9,202,249 | B1 | 12/2015 | Cohen et al. |
| 9,386,165 | B2 | 7/2016 | Raleigh et al. |
| 9,514,159 | B2 | 12/2016 | Barsness |
| 9,516,053 | B1 | 12/2016 | Muddu et al. |

(Continued)

FOREIGN PATENT DOCUMENTS

| | | |
|---|---|---|
| CN | 105550189 A | 5/2016 |
| CN | 107846418 A | 3/2018 |

(Continued)

OTHER PUBLICATIONS

Apache Flink, https://flink.apache.org, accessed on or about Aug. 1, 2024.

(Continued)

*Primary Examiner* — Nelson S. Giddins
(74) *Attorney, Agent, or Firm* — Law Office of Scott P. Zimmerman, PLLC

(57) ABSTRACT

Multi-modal query processing greatly improves computer functioning. A single cybersecurity sensory nodal server concurrently processes standing queries, agent point queries, and agent fleet queries. The single cybersecurity sensory nodal server is dedicated to locally storing electronic data associated with a cybersecurity sensory agent installed at a client device. Because the single cybersecurity sensory nodal server locally stores the single source of the electronic data, the single cybersecurity sensory nodal server answers the standing queries, agent point queries, and agent fleet queries using less hardware resources, less network resources, less electrical energy, and less time.

20 Claims, 23 Drawing Sheets

(56)  References Cited

U.S. PATENT DOCUMENTS

| | | | |
|---|---|---|---|
| 9,661,003 B2 | 5/2017 | Parker | |
| 9,697,710 B2 | 7/2017 | Kuznetsov | |
| 9,825,989 B1 | 11/2017 | Mehra et al. | |
| 10,162,896 B1 | 12/2018 | Sumter et al. | |
| 10,200,262 B1 | 2/2019 | Leverich et al. | |
| 10,248,787 B1 | 4/2019 | Magar | |
| 10,320,831 B2 | 6/2019 | Agarmore et al. | |
| 10,382,454 B2 | 8/2019 | Avidan et al. | |
| 10,438,164 B1 | 10/2019 | Xiong et al. | |
| 10,498,744 B2 | 12/2019 | Hunt et al. | |
| 10,523,540 B2 | 12/2019 | Joshi et al. | |
| 10,523,914 B1 | 12/2019 | Phillips et al. | |
| 10,581,886 B1 | 3/2020 | Sharifi Mehr | |
| 10,623,433 B1 | 4/2020 | Veselov et al. | |
| 10,659,432 B2 | 5/2020 | Meyer et al. | |
| 10,673,880 B1 | 6/2020 | Pratt et al. | |
| 10,749,557 B1 | 8/2020 | Griffin et al. | |
| 10,951,606 B1 | 3/2021 | Shahidzadeh et al. | |
| RE48,656 E | 7/2021 | Goldner et al. | |
| 11,132,461 B2 | 9/2021 | Swafford et al. | |
| 11,277,416 B2 | 3/2022 | Ray et al. | |
| 11,303,651 B1 | 4/2022 | Mouleeswaran et al. | |
| 11,336,698 B1 | 5/2022 | Wu | |
| 11,343,268 B2 | 5/2022 | Apostolopoulos | |
| 11,410,420 B1 | 8/2022 | Roy et al. | |
| 11,563,756 B2 | 1/2023 | Diehl | |
| 11,604,777 B1 | 3/2023 | Fritz | |
| 11,616,790 B2 | 3/2023 | Diehl | |
| 11,721,137 B2 | 8/2023 | Fang | |
| 11,829,371 B1 | 11/2023 | Buxton, Jr. | |
| 11,836,137 B2 | 12/2023 | Nash et al. | |
| 11,962,606 B2 | 4/2024 | Shulman et al. | |
| 11,995,658 B2 | 5/2024 | Arcot Omkar | |
| 12,061,714 B2 | 8/2024 | Das | |
| 12,314,420 B2 | 5/2025 | Lance et al. | |
| 12,367,667 B2 | 7/2025 | Ast | |
| 12,399,768 B1 * | 8/2025 | Saha | G06F 11/0709 |
| 2002/0055820 A1 | 5/2002 | Scannell | |
| 2002/0078381 A1 | 6/2002 | Farley | |
| 2002/0128897 A1 | 9/2002 | Nelson | |
| 2002/0156879 A1 | 10/2002 | Delany | |
| 2003/0200293 A1 | 10/2003 | Fearn et al. | |
| 2004/0002961 A1 | 1/2004 | Dettinger et al. | |
| 2004/0205397 A1 | 10/2004 | Rajiv et al. | |
| 2004/0205398 A1 | 10/2004 | Osborn et al. | |
| 2005/0086064 A1 | 4/2005 | Dively, II et al. | |
| 2005/0198247 A1 | 9/2005 | Perry | |
| 2005/0262233 A1 | 11/2005 | Alon | |
| 2006/0031076 A1 | 2/2006 | Lei et al. | |
| 2006/0064486 A1 | 3/2006 | Baron et al. | |
| 2006/0294214 A1 | 12/2006 | Chou | |
| 2007/0179709 A1 | 8/2007 | Doyle | |
| 2007/0192080 A1 | 8/2007 | Carpenter et al. | |
| 2007/0226796 A1 | 9/2007 | Gilbert et al. | |
| 2008/0038708 A1 | 2/2008 | Slivka | |
| 2008/0080384 A1 | 4/2008 | Atkins et al. | |
| 2008/0126951 A1 | 5/2008 | Sood et al. | |
| 2008/0162565 A1 | 7/2008 | Waguet | |
| 2009/0064189 A1 | 3/2009 | Cutlip | |
| 2009/0316675 A1 | 12/2009 | Malladi | |
| 2010/0030896 A1 | 2/2010 | Chandramouli et al. | |
| 2010/0094852 A1 | 4/2010 | Gupta | |
| 2010/0185678 A1 | 7/2010 | Dettinger | |
| 2010/0250111 A1 | 9/2010 | Gutierrez et al. | |
| 2011/0022444 A1 | 1/2011 | Fridman et al. | |
| 2011/0093491 A1 | 4/2011 | Zabback | |
| 2011/0099632 A1 | 4/2011 | Beck et al. | |
| 2011/0131588 A1 | 6/2011 | Allam | |
| 2011/0181443 A1 | 7/2011 | Gutierrez et al. | |
| 2011/0299597 A1 | 12/2011 | Freiburg et al. | |
| 2012/0079092 A1 | 3/2012 | Woxblom | |
| 2012/0137367 A1 | 5/2012 | Dupont et al. | |
| 2012/0166688 A1 | 6/2012 | Schoning et al. | |
| 2012/0256915 A1 | 10/2012 | Jenkins | |
| 2013/0007151 A1 | 1/2013 | Chen et al. | |
| 2013/0021933 A1 | 1/2013 | Kovvali et al. | |
| 2013/0290110 A1 | 10/2013 | LuVogt et al. | |
| 2013/0290339 A1 | 10/2013 | LuVogt et al. | |
| 2013/0290905 A1 | 10/2013 | LuVogt et al. | |
| 2013/0298244 A1 | 11/2013 | Kumar et al. | |
| 2013/0332090 A1 | 12/2013 | Scolnicov et al. | |
| 2013/0333040 A1 | 12/2013 | Diehl et al. | |
| 2014/0007222 A1 | 1/2014 | Qureshi et al. | |
| 2014/0032535 A1 | 1/2014 | Singla | |
| 2014/0075004 A1 | 3/2014 | Van Dusen | |
| 2014/0085107 A1 | 3/2014 | Gutierrez | |
| 2014/0201836 A1 | 7/2014 | Amsler | |
| 2014/0201838 A1 | 7/2014 | Varsanyi et al. | |
| 2014/0283067 A1 | 9/2014 | Call | |
| 2015/0227582 A1 | 8/2015 | Gu et al. | |
| 2015/0358790 A1 | 12/2015 | Nasserbakht | |
| 2016/0034576 A1 | 2/2016 | Jiang | |
| 2016/0119365 A1 | 4/2016 | Barel | |
| 2016/0163172 A1 | 6/2016 | Hosomi | |
| 2016/0163186 A1 | 6/2016 | Davidson et al. | |
| 2016/0179618 A1 | 6/2016 | Resch et al. | |
| 2016/0191351 A1 | 6/2016 | Smith et al. | |
| 2016/0210427 A1 | 7/2016 | Mynhier et al. | |
| 2016/0246929 A1 | 8/2016 | Zenati et al. | |
| 2016/0248803 A1 | 8/2016 | O'Connell et al. | |
| 2016/0321574 A1 | 11/2016 | Peterson | |
| 2016/0373588 A1 | 12/2016 | Raleigh et al. | |
| 2017/0012854 A1 | 1/2017 | Balasubramanian | |
| 2017/0039245 A1 | 2/2017 | Wholey, III | |
| 2017/0078316 A1 | 3/2017 | Liang et al. | |
| 2017/0109530 A1 | 4/2017 | Diehl et al. | |
| 2017/0214701 A1 | 7/2017 | Hasan | |
| 2017/0235848 A1 | 8/2017 | Van Dusen et al. | |
| 2017/0244762 A1 | 8/2017 | Kinder et al. | |
| 2017/0264589 A1 | 9/2017 | Hunt et al. | |
| 2018/0004817 A1 | 1/2018 | Nguyen | |
| 2018/0004943 A1 | 1/2018 | Lukacs | |
| 2018/0013768 A1 | 1/2018 | Hunt et al. | |
| 2018/0020021 A1 | 1/2018 | Gilmore et al. | |
| 2018/0024901 A1 | 1/2018 | Tankersley et al. | |
| 2018/0060926 A1 | 3/2018 | Guadagno | |
| 2018/0069875 A1 | 3/2018 | Ben Ezra et al. | |
| 2018/0091559 A1 | 3/2018 | Luger | |
| 2018/0173580 A1 | 6/2018 | Pavlas et al. | |
| 2018/0183821 A1 * | 6/2018 | Schneider | G06F 16/285 |
| 2018/0234434 A1 | 8/2018 | Viljoen | |
| 2018/0260251 A1 | 9/2018 | Beveridge et al. | |
| 2018/0278647 A1 | 9/2018 | Gabaev et al. | |
| 2018/0285873 A1 | 10/2018 | Espinoza et al. | |
| 2018/0308112 A1 | 10/2018 | Prentice et al. | |
| 2018/0314740 A1 | 11/2018 | Van Osten | |
| 2018/0329958 A1 | 11/2018 | Choudhury | |
| 2018/0367549 A1 | 12/2018 | Jang et al. | |
| 2019/0014141 A1 | 1/2019 | Segal et al. | |
| 2019/0081983 A1 | 3/2019 | Teal | |
| 2019/0098032 A1 | 3/2019 | Murphey | |
| 2019/0108470 A1 | 4/2019 | Jain | |
| 2019/0110241 A1 | 4/2019 | Jain | |
| 2019/0121979 A1 | 4/2019 | Chari et al. | |
| 2019/0130009 A1 | 5/2019 | McLean | |
| 2019/0130512 A1 | 5/2019 | Kuhn | |
| 2019/0164168 A1 | 5/2019 | Sundaramoorthy et al. | |
| 2019/0166152 A1 | 5/2019 | Steele et al. | |
| 2019/0182267 A1 | 6/2019 | Aher et al. | |
| 2019/0182269 A1 | 6/2019 | Lee et al. | |
| 2019/0190945 A1 | 6/2019 | Jang et al. | |
| 2019/0190952 A1 | 6/2019 | Cherry | |
| 2019/0222594 A1 | 7/2019 | Davis, III et al. | |
| 2019/0229915 A1 | 7/2019 | Digiambattista et al. | |
| 2019/0253431 A1 | 8/2019 | Atanda | |
| 2019/0260879 A1 | 8/2019 | Raleigh et al. | |
| 2019/0287004 A1 | 9/2019 | Bhoj et al. | |
| 2019/0289025 A1 | 9/2019 | Kursun et al. | |
| 2019/0319987 A1 | 10/2019 | Levy et al. | |
| 2019/0340912 A1 | 11/2019 | Sellathamby et al. | |
| 2019/0349204 A1 | 11/2019 | Enke et al. | |
| 2019/0370146 A1 | 12/2019 | Babu et al. | |
| 2020/0012239 A1 | 1/2020 | Yamamoto | |
| 2020/0036603 A1 | 1/2020 | Nieves et al. | |

(56) References Cited

U.S. PATENT DOCUMENTS

| | | |
|---|---|---|
| 2020/0057953 A1 | 2/2020 | Livny et al. |
| 2020/0067969 A1 | 2/2020 | Abbaszadeh et al. |
| 2020/0135311 A1 | 4/2020 | Mairs |
| 2020/0145449 A1 | 5/2020 | Segal et al. |
| 2020/0193018 A1 | 6/2020 | Van Dyke |
| 2020/0220754 A1 | 7/2020 | Hunter et al. |
| 2020/0244680 A1 | 7/2020 | Brandel et al. |
| 2020/0259852 A1 | 8/2020 | Wolff et al. |
| 2020/0274894 A1 | 8/2020 | Argoeti et al. |
| 2020/0285737 A1 | 9/2020 | Kraus et al. |
| 2020/0296124 A1 | 9/2020 | Pratt et al. |
| 2020/0314117 A1 | 10/2020 | Nguyen et al. |
| 2020/0321122 A1 | 10/2020 | Neumann |
| 2020/0371512 A1 | 11/2020 | Srinivasamurthy et al. |
| 2021/0042408 A1 | 2/2021 | Van Dyke et al. |
| 2021/0042854 A1 | 2/2021 | Hazy et al. |
| 2021/0055927 A1 | 2/2021 | Sarukkai et al. |
| 2021/0075686 A1 | 3/2021 | Smith et al. |
| 2021/0081539 A1 | 3/2021 | Karin et al. |
| 2021/0083891 A1 | 3/2021 | Anchondo |
| 2021/0117251 A1 | 4/2021 | Cristofi et al. |
| 2021/0182387 A1 | 6/2021 | Zhu et al. |
| 2021/0211438 A1 | 7/2021 | Trim et al. |
| 2021/0248443 A1 | 8/2021 | Shu et al. |
| 2021/0266333 A1 | 8/2021 | Wright et al. |
| 2021/0273957 A1 | 9/2021 | Boyer et al. |
| 2021/0288981 A1 | 9/2021 | Numainville et al. |
| 2021/0320944 A1 | 10/2021 | Ogle et al. |
| 2021/0326452 A1 | 10/2021 | Diehl et al. |
| 2021/0326453 A1 | 10/2021 | Diehl et al. |
| 2021/0329012 A1 | 10/2021 | Diehl et al. |
| 2021/0329013 A1 | 10/2021 | Diehl et al. |
| 2021/0329014 A1 | 10/2021 | Diehl et al. |
| 2021/0334369 A1 | 10/2021 | Keiter et al. |
| 2021/0352099 A1 | 11/2021 | Rogers |
| 2021/0406041 A1 | 12/2021 | Saraiya et al. |
| 2021/0406368 A1 | 12/2021 | Agranonik et al. |
| 2022/0012148 A1 | 1/2022 | Plum et al. |
| 2022/0067957 A1 | 3/2022 | Majumder |
| 2022/0136857 A1 | 5/2022 | Pompili et al. |
| 2022/0210185 A1 | 6/2022 | Boucadair et al. |
| 2022/0222686 A1 | 7/2022 | Mihara |
| 2022/0374434 A1 | 11/2022 | Nash et al. |
| 2023/0046839 A1 | 2/2023 | Raleigh et al. |
| 2023/0083443 A1 | 3/2023 | Saveliev |
| 2023/0114821 A1* | 4/2023 | Thomas ................ H04L 63/145 726/23 |
| 2023/0164151 A1 | 5/2023 | Diehl et al. |
| 2023/0229717 A1 | 7/2023 | Diehl et al. |
| 2023/0421587 A1 | 12/2023 | Meyer et al. |
| 2024/0061844 A1 | 2/2024 | Nash et al. |
| 2024/0289481 A1 | 8/2024 | Lance et al. |
| 2024/0291835 A1* | 8/2024 | Sethi ................... H04L 63/1425 |
| 2024/0305654 A1 | 9/2024 | Diehl et al. |

FOREIGN PATENT DOCUMENTS

| | | |
|---|---|---|
| EP | 3896934 A1 | 10/2021 |
| EP | 4092554 | 11/2022 |
| EP | 4296872 A1 | 12/2023 |
| GB | 2580467 | 7/2020 |
| JP | WO2015004854 A1 | 1/2015 |
| KR | 20230097438 | 7/2023 |
| WO | 2013184281 A1 | 12/2013 |
| WO | 2016049319 A1 | 3/2016 |

OTHER PUBLICATIONS

Apache Flink, Introducing Gelly, https://flink.apache.org/2015/08/24/introducing-gelly-graph-processing-with-apache-flink/, accessed on or about Aug. 1, 2024.
Apache Flink, Flink Architecture, https://flink.apache.org/what-is-flink/flink-architecture/, accessed on or about Aug. 1, 2024.
Apache Flink, Structured Streaming, https://spark.apache.org/docs/latest/structured-streaming-programming-guide.html, accessed on or about Aug. 1, 2024.
Apache Flink, Graph X, https://spark.apache.org/graphx/, accessed on or about Aug. 1, 2024.
Apache Spark Unified, https://spark.apache.org, accessed on or about Aug. 1, 2024.
Zaman, Ahmed Uz, "Introduction to Spark Streaming: Real-Time Data Processing with Ease", 12 pages, Apr. 30, 2023.
Snowflake, "Breaking the Streaming and Batch Silos," https://www.snowflake.com/en/solutions/use-cases/snowflake-streaming-data-pipelines/, accessed on or about Aug. 1, 2024.
"Graph Analytics," Relational AI, https://docs.relational.ai/preview/snowflake/graph-analytics, accessed on or about Aug. 1, 2024.
Snowflake Guides, "Best Practices for Building Database Applications," https://www.snowflake.com/guides/best-practices-database-applications/#:~:text=Data%20concurrency,clusters%2C%20eliminating%20slowdowns%20and%20disruptions., accessed on or about Aug. 1, 2024.
Snowflake Documentation, "Warehouse considerations," https://docs.snowflake.com/en/user-guide/warehouses-considerations, accessed on or about Aug. 1, 2024.
Snowflake Guides, "Real-time Analytics Realizes Data's Potential," https://www.snowflake.com/guides/real-time-analytics-realizes-datas-potential/, accessed on or about Aug. 1, 2024.
Final Office Action for U.S. Appl. No. 17/849,537 mailed Jan. 24, 2025, 43 pages.
Non-Final Office Action for U.S. Appl. No. 17/576,734, Diehl, "Optimized Real-Time Streaming Graph Queries in a Distributed Digital Security System," mailed Jun. 14, 2023, 23 pages.
Applicant's Response to the Jun. 14, 2023 Office Action submitted Oct. 16, 2023 to U.S. Appl. No. 17/576,734, Diehl, "Optimized Real-Time Streaming Graph Queries in a Distributed Digital Security System," 17 pages.
Applicant's response to the Feb. 2, 2024 Notice of Non-Compliant Amendment submitted Feb. 7, 2024 to U.S. Appl. No. 17/576,734, Diehl, "Optimized Real-Time Streaming Graph Queries in a Distributed Digital Security System," 11 pages.
Final Office Action for U.S. Appl. No. 17/576,734, Diehl, "Optimized Real-Time Streaming Graph Queries in a Distributed Digital Security System," mailed May 20, 2024, 26 pages.
Applicant's Response to the May 20, 2024 Final Office Action submitted Aug. 14, 2024 to U.S. Appl. No. 17/576,734, Diehl, "Optimized Real-Time Streaming Graph Queries in a Distributed Digital Security System," 19 pages.
Advisory Action for U.S. Appl. No. 17/576,734, Diehl, "Optimized Real-Time Streaming Graph Queries in a Distributed Digital Security System," mailed Sep. 5, 2024, 4 pages.
Non-Final Office Action for U.S. Appl. No. 17/576,734, Diehl, "Optimized Real-Time Streaming Graph Queries in a Distributed Digital Security System," mailed Oct. 31, 2024, 25 pages.
Applicant's Response to the Oct. 31, 2024 Office Action submitted Mar. 27, 2025 to U.S. Appl. No. 17/576,734, Diehl, "Optimized Real-Time Streaming Graph Queries in a Distributed Digital Security System," 35 pages.
Final Office Action for U.S. Appl. No. 17/576,734, Diehl, "Optimized Real-Time Streaming Graph Queries in a Distributed Digital Security System," mailed Jun. 20, 2025, 29 pages ***********.
Applicant's Response to the Jun. 20, 2025 Final Office Action submitted Aug. 18, 2025 to U.S. Appl. No. 17/576,734, Diehl, "Optimized Real-Time Streaming Graph Queries in a Distributed Digital Security System," 18 pages.
Advisory Action for U.S. Appl. No. 17/576,734, Diehl, "Optimized Real-Time Streaming Graph Queries in a Distributed Digital Security System," mailed Sep. 8, 2025, 3 pages.
Office Action for U.S. Appl. No. 17/849,537, Meyer, "Distributed Digital Security System for Predicting Malicious Behavior," mailed Aug. 2, 2024, 52 pages.
Applicant's Response to the Aug. 2, 2024 Office Action submitted Oct. 30, 2024 to U.S. Appl. No. 17/849,537, Meyer, "Distributed Digital Security System for Predicting Malicious Behavior," 17 pages.

(56) References Cited

OTHER PUBLICATIONS

Final Office Action for U.S. Appl. No. 17/849,537, Meyer, "Distributed Digital Security System for Predicting Malicious Behavior," mailed Jan. 24, 2025, 43 pages.
Applicant's Response to the Jan. 24, 2025 Final Office Action submitted Apr. 23, 2025 to U.S. Appl. No. 17/849,537, Meyer, "Distributed Digital Security System for Predicting Malicious Behavior," 18 pages.
Advisory Action for U.S. Appl. No. 17/849,537, Meyer, "Distributed Digital Security System for Predicting Malicious Behavior," mailed May 13, 2025, 4 pages.
Applicant's Response to the Jan. 24, 2025 Final Office Action submitted Jun. 20, 2025 to U.S. Appl. No. 17/849,537, Meyer, "Distributed Digital Security System for Predicting Malicious Behavior," 21 pages.
Office Action for U.S. Appl. No. 17/849,537, Meyer, "Distributed Digital Security System for Predicting Malicious Behavior," mailed Aug. 25, 2025, 56 pages.
Office Action for U.S. Appl. No. 18/496,684, Nash, "Real-Time Streaming Graph Queries," mailed Dec. 12, 2024, 25 pages.
Applicant's Response to the Dec. 12, 2024 Office Action submitted Mar. 12, 2025 to U.S. Appl. No. 18/496,684, Nash, "Real-Time Streaming Graph Queries," 17 pages.
Final Office Action for U.S. Appl. No. 18/496,684, Nash, "Real-Time Streaming Graph Queries," mailed Jun. 27, 2025, 25 pages.
Notice of Allowance for U.S. Appl. No. 18/115,647, Lance, "Query Management in a Streaming System," mailed Jan. 29, 2025, 13 pages.
Applicant's Response to the Jun. 7, 2022 Office Action submitted Sep. 7, 2022 to U.S. Appl. No. 17/325,097, Nash, "Real-Time Streaming Graph Queries," 14 pages.
Applicant's Response to the Apr. 13, 2023 Final Office Action submitted Jun. 13, 2023 to U.S. Appl. No. 17/325,097, Nash, "Real-Time Streaming Graph Queries," 18 pages.
Non-Final Office Action for U.S. Appl. No. 18/334,260, Diehl, "Distributed Digital Security System," mailed Aug. 4, 2025, 26 pages.
Non-Final Office Action for U.S. Appl. No. 18/663,974, Diehl, "Distributed Digital Security System," mailed Jul. 15, 2025, 14 pages.
Applicant's response to the Jun. 27, 2025 Final Office Action submitted Sep. 26, 2025 to U.S. Appl. No. 18/496,684, Nash, "Real-Time Streaming Graph Queries," 20 pages.
Applicant's response to the Jun. 20, 2025 Final Office Action submitted Sep. 18, 2025 to U.S. Appl. No. 17/576,734, Diehl, "Optimized Real-Time Streaming Graph Queries in a Distributed Digital Security System," 23 pages.
Final Office Action for U.S. Appl. No. 17/576,734, Diehl, "Optimized Real-Time Streaming Graph Queries in a Distributed Digital Security System," mailed Oct. 1, 2025, 31 pages.
Office Action for U.S. Appl. No. 18/663,974, mailed on Nov. 21, 2024, 15 pages.
Non-Final Office Action for U.S. Appl. No. 17/849,537, mailed 20240802, 52 pages.
Coppolino, et al., "A framework for mastering heterogeneity in multi-layer security information and event correlation", Journal of Systems Architecture, vol. 62, Dec. 2, 2015, pp. 78-88.
The Extended European Search Report mailed Aug. 19, 2021 for European Patent Application No. 21164747.4, 9 pages.

The Extended European Search Report mailed Aug. 24, 2021 for European Patent Application No. 21164749.0, 9 pages.
The Extended European Search Report mailed Aug. 27, 2021 for European Patent Application No. 21164750.8, 7 pages.
The Extended European Search Report mailed Aug. 31, 2021 for European Patent Application No. 21164751.6, 7 pages.
The Extended European Search Report mailed Sep. 6, 2021 for European Patent Application No. 21164753.2, 8 pages.
Extended European Search Report for EP Patent Application No. 23180786.8, mailed Oct. 23, 2023, 7 pages.
Final Office Action for U.S. Appl. No. 16/849,543, mailed Aug. 26, 2022, 33 pages.
Final Office Action for U.S. Appl. No. 16/849,579, mailed on Nov. 14, 2022, Diehl, "Distributed Digital Security System", 23 pages.
Final Office Action for U.S. Appl. No. 17/325,097, mailed Apr. 13, 2023, 22 pages.
Non-Final Office Action for U.S. Appl. No. 16/849,543, mailed Feb. 16, 2022, 30 pages.
Notice of Allowance for U.S. Appl. No. 16/849,543, mailed Jan. 3, 2023, 8 pages.
Notice of Allowance for U.S. Appl. No. 17/325,097, mailed Jul. 26, 2023, 23 pages.
Office Action for U.S. Appl. No. 16/849,411, , mailed on Oct. 6, 2021, Diehl, "Distributed Digital Security System", 9 pages.
Office Action for U.S. Appl. No. 16/849,496, mailed on Sep. 30, 2022, Diehl, "Distributed Digital Security System", 8 pages.
Office Action for U.S. Appl. No. 16/849,496, mailed on Dec. 24, 2021, Diehl, "Distributed Digital Security System", 8 pages.
Office Action for U.S. Appl. No. 16/849,579, mailed Apr. 26, 2022, Diehl, "Distributed Digital Security System", 20 pages.
Office Action for U.S. Appl. No. 17/325,097, mailed on Jun. 7, 2022, Nash, "Real-Time Streaming Graph Queries", 20 pages.
Choudhury, Sutanay, et al "StreamWorks—A system for Dynamic Graph Search," Proceedings of the 2013 ACM SIGMOD International Conference on Management of Data (Jun. 2013) pp. 1101-1104.
Pacaci, Anil, et al "Regular Path Query Evaluation on Streaming Graphs," arXiv:2004.02012v1 [cs.DB] Apr. 4, 2020, 19 pages.
Song, Fuqi, et al "Extended Query Pattern Graph and Heuristics—based SPARQL Query Planning," Procedia Computer Science vol. 60 (2015) pp. 302-311.
Extended European Search Report for EP Patent Application No. 22170149.3, mailed Oct. 13, 2022, 9 pages.
Amended Claims in EP Patent Application No. 22170149.3, filed May 2, 2023, 36 pages.
Intention to Grant for EP Patent Application No. 22170149.3, dated Aug. 26, 2024, 116 pages.
Office Action for U.S. Appl. No. 18/663,974, dated May 8, 2025, 12 Pages.
European Search Report for EP Application No. 22170149, 2 pages.
Office Action for U.S. Appl. No. 18/116,629, mailed on Sep. 14, 2023, Diehl, "Distributed Digital Security System," 10 Pages.
Office Action for U.S. Appl. No. 16/849,543, mailed on Feb. 16, 2022, Diehl, "Distributed Digital Security System," 29 Pages.
Office Action for U.S. Appl. No. 16/849,543, mailed on Aug. 26, 2022, Diehl, "Distributed Digital Security System," 32 Pages.
Notice of Allowance for U.S. Appl. No. 18/496,684, Nash, "Real-Time Streaming Graph Queries," mailed Nov. 24, 2025, 22 pages.
Corrected Notice of Allowance for U.S. Appl. No. 18/496,684, Nash, "Real-Time Streaming Graph Queries," mailed Dec. 5, 2025, 8 pages.

* cited by examiner

| Sensory Agent Identifier | Time Stamp | Sensory Nodal Server | Network Address |
|---|---|---|---|
| AID1 | Time1 | ServerID1 | IP Address1 |
| AID2 | Time2 | ServerID2 | IP Address2 |
| AID3 | Time3 | ServerID3 | IP Address3 |
| AID4 | Time4 | ServerID4 | IP Address4 |

MULTI-MODAL QUERIES IN A DIGITAL CYBERSECURITY SYSTEMS

BACKGROUND

The subject matter described herein generally relates to computers and to computer databases and, more particularly, the subject matter relates to graphical storage structures.

Cybersecurity services are vital for today's smartphones, laptops, servers, and other computers. It seems every day there is another cybersecurity hack that steals account passwords, business data, and personal information. Cybersecurity services, though, protect computers from cybersecurity threats. Indeed, cybersecurity services are always improving to detect ever-evolving cybersecurity threats.

SUMMARY

Multi-modal query processing greatly improves a cybersecurity service. Cybersecurity data from a client device is routed to a single computer server for dedicated network storage. Because the single computer server represents a sole source for the cybersecurity data from the client device, the single computer server implements multi-modal query processing for faster and more efficient detection of cybersecurity threats. The single computer server concurrently processes standing queries, agent point queries, and agent fleet queries. Because the single computer server locally and entirely stores the cybersecurity data, the single computer server answers the standing queries, agent point queries, and agent fleet queries using less hardware resources, less network resources, less electrical energy, and less time. The single computer server, implementing multi-modal query processing, provides faster and more efficient detection of cybersecurity threats.

BRIEF DESCRIPTION OF THE SEVERAL VIEWS OF THE DRAWINGS

The features, aspects, and advantages of multi-modal queries are understood when the following Detailed Description is read with reference to the accompanying drawings, wherein.

DETAILED DESCRIPTION

Figure 1:
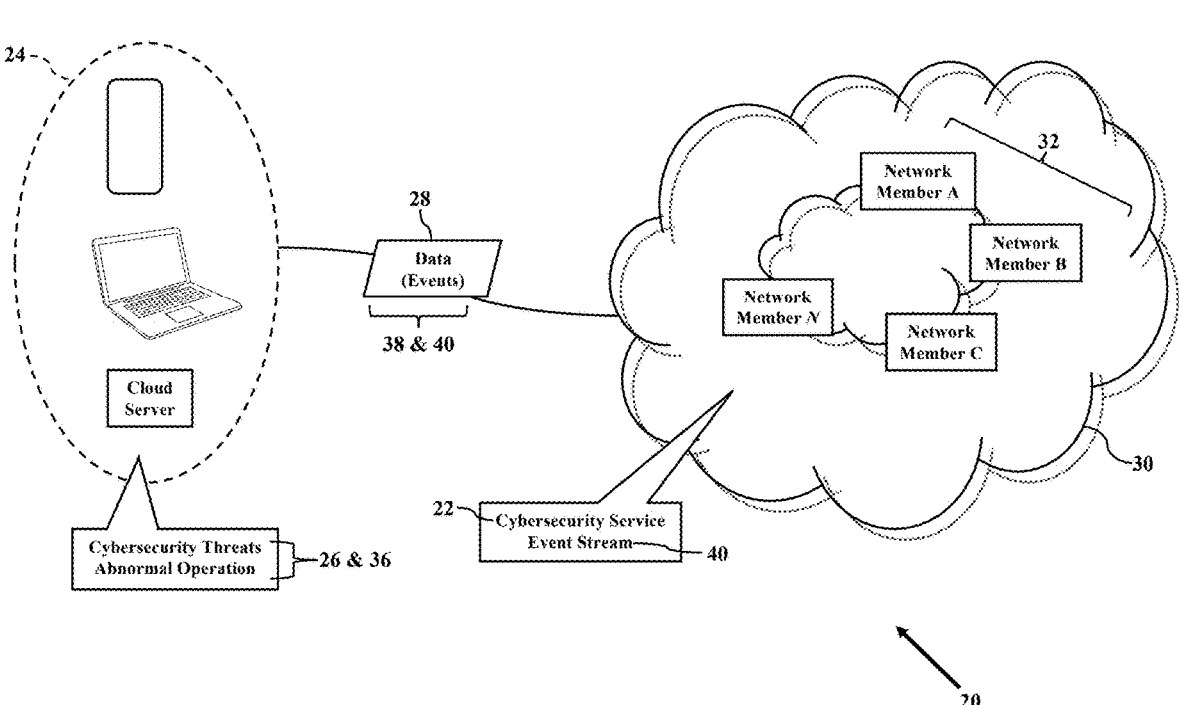
FIGS. 1-3 illustrate some examples of a digital cybersecurity system that provides a digital cybersecurity service.

Cybersecurity services are always improving. Computers and software are vulnerable to cybersecurity threats. As we all know, nearly every day there is another cybersecurity hack that steals account passwords, business data, and personal information. Indeed, cyberattackers are constantly changing their tactics to avoid detection. Cybersecurity services, though, protect computers by using sophisticated techniques to detect cybersecurity threats. Cybersecurity service providers are thus constantly improving their techniques to detect ever-changing cybersecurity threats.

Some examples relate to multi-modal query processing in a cybersecurity service. Multi-modal query processing is an elegant improvement to the cybersecurity service. The multi-modal query processing allows the cybersecurity service detect cybersecurity threats using less time, less computer processor and memory, less network communications, and less electrical energy. The multi-modal query processing, in plain words, allows the cybersecurity service to more quickly detect cybersecurity threats, perhaps within seconds.

Multi-modal query processing allows a single computer server to answer different types of data queries. The single computer server locally stores all the cybersecurity data sent from a client device. Because the single computer server stores all the cybersecurity data in local memory, the cybersecurity service need only query that single computer server for the cybersecurity data. The cybersecurity service need not query multiple devices that waste time and energy. Moreover, because the single computer server is the sole source for the cybersecurity data, the single computer server processes different types of queries for even more time savings and efficiencies. The single computer server, for example, concurrently processes standing queries, agent point queries, and agent fleet queries. The single computer server answers these different types of queries, again without the cybersecurity service wasting time and energy in contacting other storage locations. The cybersecurity service thus detects cybersecurity threats using less hardware resources, less network resources, less electrical energy, and less time.

Multi-modal query processing will now be described more fully hereinafter with reference to the accompanying drawings. Multi-modal query processing, however, may be embodied in many different forms and should not be construed as limited to the examples set forth herein. These examples are provided so that this disclosure will be thorough and complete and fully convey multi-modal query processing to those of ordinary skill in the art. Moreover, all the examples of multi-modal query processing are intended to encompass both structural and functional equivalents thereof. Additionally, it is intended that such equivalents include both currently known equivalents as well as equivalents developed in the future (i.e., any elements developed that perform the same function, regardless of structure).

Figure 2:
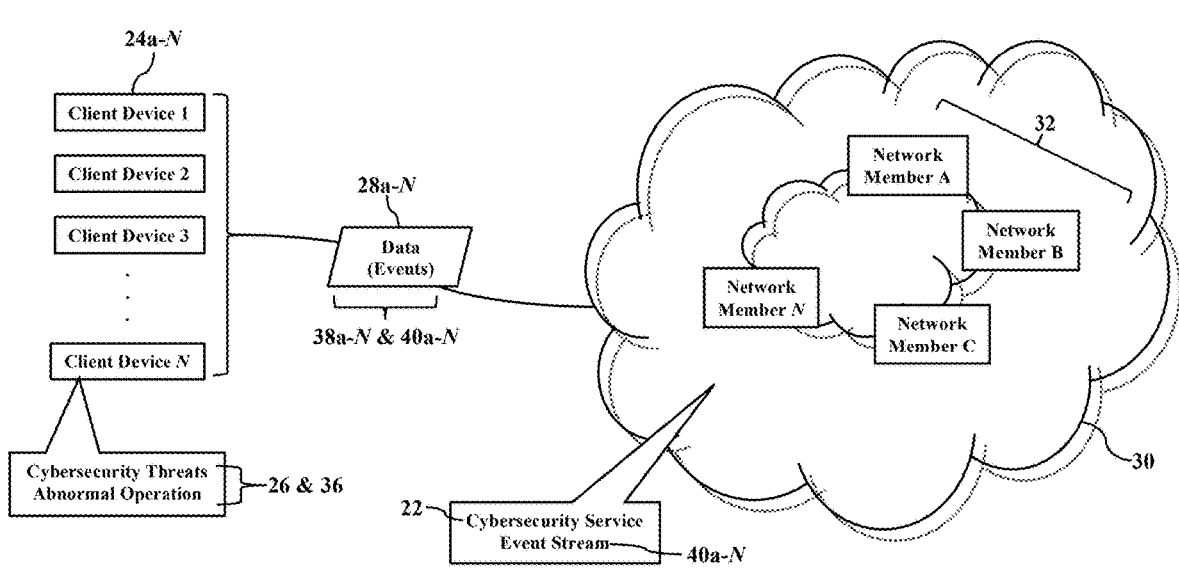
Figure 3:
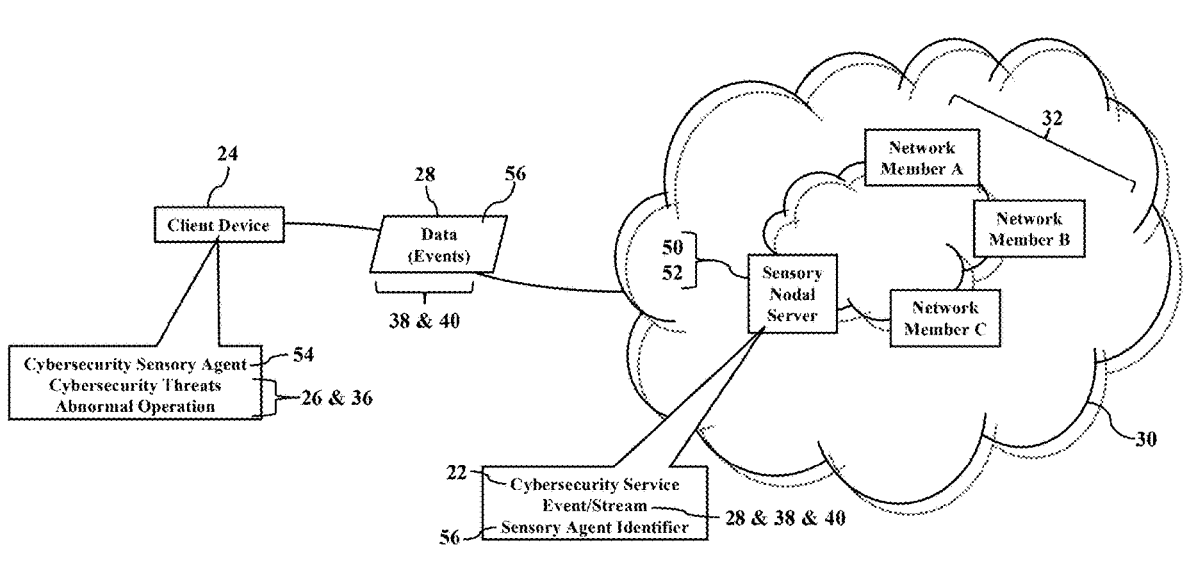

FIGS. 1-3 illustrate some examples of a digital cybersecurity system 20 that provides a digital cybersecurity service 22. The cybersecurity system 20 and the cybersecurity service 22 are provided by a service provider that protects client devices 24 from viruses, malware, and other cybersecurity threats 26. As each client device 24 operates, each client device 24 streams electronic data 28 to a cloud computing environment 30. The cloud computing environment 30 has many servers, devices, computer systems, and/or other networked members 32 that provide the digital cybersecurity system 20 and service 22. The networked members 32 communicate with each other (such as via a public Internet, a private network, and/or a hybrid network) and cooperate to protect the client devices 24 from the cybersecurity threats 26. The networked members 32, for example, inspect the electronic data 28 (sent from each client device 24) for suspicious or abnormal operation 36. While the electronic data 28 may include a vast amount of information, FIG. 1, for simplicity, illustrates the electronic data 28 as event data associated with operating system events 38 conducted by the client device 24. The events 38, as simple examples, describe computer behaviors, activities, and contexts performed by, or occurring on, the client device 24. When the cloud computing environment 30 receives streams of the events 38 (sometimes referred to as event streams 40), the cloud computing environment 30 analyzes the event(s)/stream(s) 38/40 for suspicious or abnormal operation 36. If the cloud computing environment 30 detect(s) evidence of the cybersecurity threat 26, then the digital cybersecurity system 20 and the cybersecurity service 22 may implement procedures to stop the cybersecurity threat 26 and/or to minimize damage to the client device 24.

FIG. 2 simply illustrates the scale of the electronic data 28 received by the digital cybersecurity service 22. The digital cybersecurity system 20 may simultaneously protect millions of client devices 24 from cybersecurity threats 26. That is, in actual, real world practice, there may be millions of the client devices (illustrated as reference numerals 24a-N) subscribing to the cybersecurity service 22. As the reader may understand, then, the digital cybersecurity system 20 receives a massive amount of the electronic data 28. As these millions of the client devices 24a-N operate, each client device 24 streams its respective electronic data 28 to the remote cloud computing environment 30. Each day, in fact, the cloud-based cybersecurity system 20 may receive over two trillion of the events 38, and these trillions of events 38 may require a petabyte or more of daily storage capacity (e.g., $2^{50}$ bytes or 1 million gigabytes). If the cybersecurity service 22 is to effectively detect the cybersecurity threats 26 before damage is done, then the digital cybersecurity system 20 must store and analyze massive amounts of the electronic data 28 in substantially near real time (such as, for example, within seconds).

FIG. 3 illustrates examples of dedicated nodal storage. Because the cybersecurity system/service 20/22 must store and analyze massive amounts of the streaming electronic data 28, the cybersecurity system/service 20/22 implements an elegant and sophisticated storage scheme. Some of the networked members 32, for example, may be computer systems 50 that store the events 38. FIG. 3 illustrates the computer system 50 as a cybersecurity sensory nodal server 52, but the computer system 50 may be other processor-controlled devices. The sensory nodal server 52 is responsible for locally storing the events/streams 38/40 sent by particular one(s) of the client devices 24. The sensory nodal server 52, in other words, may be dedicated to a particular one or more endpoint cybersecurity sensory agents 54. That is, as the cloud computing environment 30 receives the trillions of events 38 from the millions of the client devices 24, the networked members 32 segregate and store the events 38 according to the endpoint cybersecurity sensory agent 54 installed at the client device 24. Each client device 24, in other words, subscribes to the digital cybersecurity service 22 by downloading, storing, and executing the endpoint cybersecurity sensory agent 54. The cybersecurity sensory agent 54 is computer program that instructs the client device 24 to stream the events 38 to a network address (e.g., IP address) associated with the digital cybersecurity system/service 20/22. The cybersecurity sensory agent 54 and/or the networked members 32 may add, tag, augment, or label each event 38 with metadata or data fields that describe a cybersecurity sensory agent identifier (or sometimes "AID") 56. The cybersecurity sensory agent identifier 56 uniquely identifies the corresponding cybersecurity sensory agent 54 from all other cybersecurity sensory agents 54 operating in the field. As the cloud computing environment 30 receives the trillions of the daily events 38, the networked members 32 read the cybersecurity sensory agent identifier 56 that accompanies each event 38 and/or event stream 40. The networked members 32 then route the event/stream 38/40 to its dedicated cloud storage location.

The sensory nodal server 52 may thus locally host the events/streams 38/40 associated with the cybersecurity sensory agent 54. The sensory nodal server 52 is assigned to locally store the events/streams 38/40 originating from the client device 24 and associated with the cybersecurity sensory agent 54. As the cloud computing environment 30 ingests the events 38 streamed from the client device, the networked members 32 24 provide a stateful streaming system that routes the events 38 to the sensory nodal server 52 dedicated to the cybersecurity sensory agent 54. The digital cybersecurity system/service 20/22 may partition the events 38 according to the cybersecurity sensory agent identifier 56 associated with the cybersecurity sensory agent 54. The digital cybersecurity system/service 20/22 thus segregates all the electronic data 28 associated with the cybersecurity sensory agent 54 in a single local database on a single host (such as the dedicated sensory nodal server 52). The sensory nodal server 52 is tasked with exclusively storing the streaming events 38 associated with the cybersecurity sensory agent 54. The sensory nodal server 52, in other words, may be a dedicated repository for the event streams 40 sent from the corresponding client device 24 executing the cybersecurity sensory agent 54. The cloud computing environment 30 and its networked members 32 are programmed and/or configured to forward all the event streams 40 associated with the cybersecurity sensory agent 54 to the dedicated sensory nodal server 52. The sensory nodal server 52 thus maintains a centralized, sole data representation of the events 38 sent from the cybersecurity sensory agent 54.

The cybersecurity sensory agent 54 monitors the client device 24. The cybersecurity sensory agent 54 interfaces with an operating system (not shown for simplicity) executed by the client device 24. The cybersecurity sensory agent 54 is a software application or program code stored in a memory device (not shown for simplicity) of the client device 24 and executed by a hardware processor (not shown for simplicity) operating within the client device 24. The cybersecurity sensory agent 54 may thus have permissions to monitor any kernel-level activity and/or any user-mode activity conducted by the client device 24 (such as any smartphone, laptop, tablet, server, switch, or other computer). Should the cybersecurity sensory agent 54 detect any suspicious events/streams 38/40, the cybersecurity sensory agent 54 cooperates with the operating system to generate and send the events/streams 38/40 (via an access network or other communications network, not shown for simplicity) to the cloud computing environment 30.

The endpoint cybersecurity sensory agent 54 may be an antimalware driver. The endpoint cybersecurity agent 54, for example, may have kernel-level components having kernel-level permissions to a kernel of the host client device's operating system. The endpoint cybersecurity agent 54 may additionally have user-mode components having user-level permissions to a user mode of the host client device's operating system. The endpoint cybersecurity agent 54 may include computer program, code, or instructions that scan and monitor the host client device's operating system for events, communications, processes, activities, behaviors, data values, usernames/logins, locations, contexts, and/or patterns. Because the endpoint cybersecurity agent 54 has kernel-level permissions, the endpoint cybersecurity agent 54 may monitor any kernel-level activity and/or any user-mode activity conducted by the client device 24. The endpoint cybersecurity agent 54 may register for and receive kernel-level notifications and call backs from the kernel.

Figure 4:
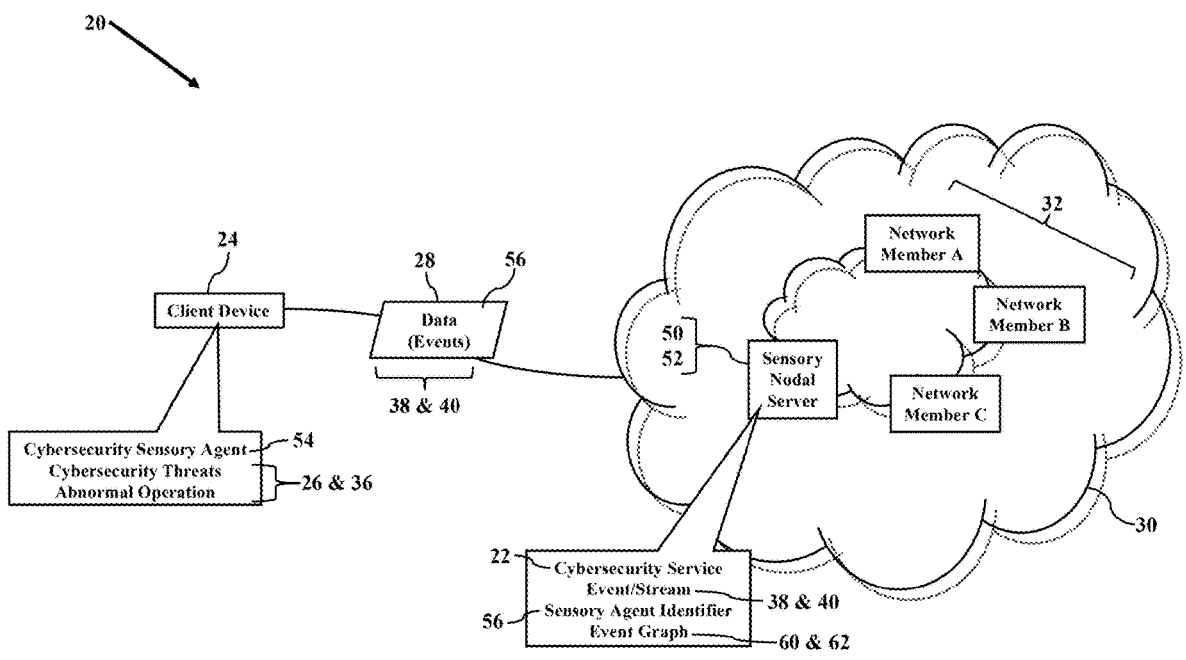
FIG. 4 illustrates examples of cybersecurity detection.

FIG. 4 illustrates examples of cybersecurity detection 60. Because the sensory nodal server 52 locally stores all the events/streams 38/40 sent from the cybersecurity sensory agent 54, the sensory nodal server 52 quickly detects the abnormal operation 36 conducted by the client device 24. As the cloud computing environment 30 forwards all the electronic data 28 to the sensory nodal server 52 dedicated to the cybersecurity sensory agent 54, the dedicated sensory nodal server 52 may inspect and analyze the events/streams 38/40 in near real time. The sensory nodal server 52 analyzes the events/streams 38/40 for any computer behaviors, activities, and/or contexts that indicate the cybersecurity threat 26. Indeed, the many networked members 32 of the cloud computing environment 30 may cooperate to also analyze the events/streams 38/40 locally stored by the sensory nodal server 52. Because the cloud computing environment 30 provides the digital cybersecurity service 22, the many networked members 32 may cooperate with the sensory nodal server 52 to analyze the events/streams 38/40 for evidence of cybersecurity threats 26. As the dedicated sensory nodal server 52 may be the sole, centralized repository for the events 38 associated with the cybersecurity sensory agent 54, the sensory nodal server 52 may store both historical and current records of the events/streams 38/40 sent from the client device 24. The networked members 32 may query the dedicated sensory nodal server 52 for the events 38 of current and/or historical interest. The networked members 32 may thus retrieve and analyze historical and/or current events 38 to protect the client device 24 from cybersecurity threats.

The sensory nodal server 52, for example, may perform near real time cybersecurity detection 60. The sensory nodal server 52 locally stores all the events/streams 38/40 sent from the corresponding client device 24 running the cybersecurity sensory agent 54. The dedicated sensory nodal server 52 may locally analyze the events/streams 38/40 for abnormal operation 36. While cybersecurity service 22 and the sensory nodal server 52 may implement many different schemes for analyzing the events/streams 38/40, FIG. 4 illustrates an event graph 62 as one of the detection schemes. The sensory nodal server 52, for example, may locally generate and store the event graph 62 using the events 38 entirely and locally stored in memory and on-disk. The event graph 62 is a sophisticated, graphical technique for detecting evidence of cybersecurity threats 26 affecting or occurring at the client device 24. A detailed explanation of the event graph 62, though, is not needed here. In simple words, the event graph 62 has nodes and edges between the nodes. Each node may represent one or more of the events 38, and the edges may represent the computer relationships between the events 38. The sensory nodal server 52 generates the event graph 62 in near real time and analyzes the event graph 62 for evidence of cybersecurity threats 26. Indeed, as more and more events 38 are received over time, the sensory nodal server 52 may update the event graph 62, again in substantially near real time. The sensory nodal server 52 may graphically traverse the event graph 62 and detect abnormal or even suspicious behavior, in substantially near real time. The sensory nodal server 52 may also generate the event graph 62 using historical events 38 occurring in the past. The sensory nodal server 52 may thus perform near real time and historical cybersecurity detection 60 to protect the client device 24 from cybersecurity threats 26. The cybersecurity detection 60 using the event graph 62 is more fully explained by U.S. patent application Ser. No. 17/325,097, which has since issued as U.S. Pat. No. 11,836,137, and incorporated herein by reference in its entirety.

Figure 5:
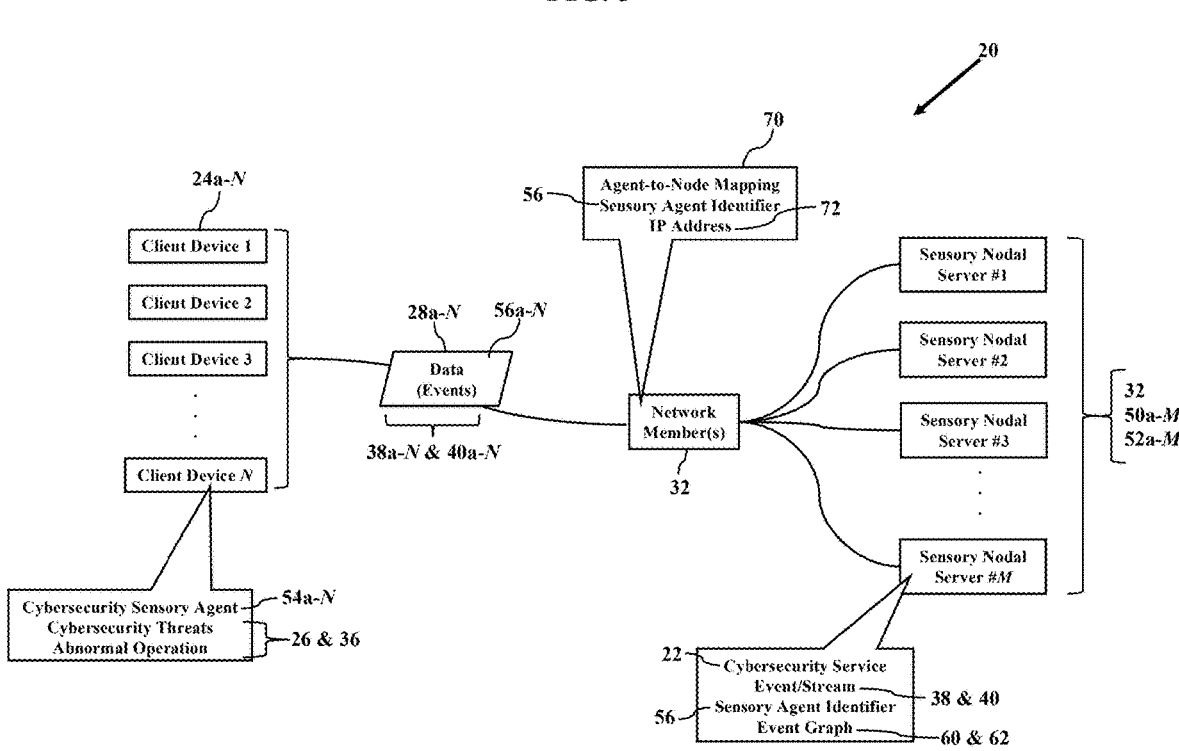
FIG. 5 illustrates more examples of dedicated network nodal storage.

FIG. 5 illustrates more examples of dedicated network nodal storage. Each client device 24 that subscribes to the cybersecurity service 22 also downloads the cybersecurity sensory agent 54. The cybersecurity sensory agent 54 instructs its host (e.g., the client device 24) to send its streaming electronic data 28 to the cloud computing environment 30 (as explained with reference to FIG. 3). Because there may be millions of the client devices (illustrated as reference numerals 24a-N) subscribing to the cybersecurity service 22, the cloud computing environment 30 may receive trillions of the corresponding events 38a-N and event streams 40a-N. Each event/stream 38/40 may further identify, include, or specify the corresponding cybersecurity sensory agent identifier 56a-N associated with the cybersecurity sensory agent 54a-N. Because the cybersecurity service 22 utilizes dedicated nodal storage, there is a sensory nodal server 52 dedicated to the events/streams 38/40 affiliated with the corresponding cybersecurity sensory agent 54. So, when the cybersecurity service 22 receives the many event streams 40a-N, the networked members 32 route each event stream 40a-N to its corresponding and dedicated sensory nodal server 52 for storage and analysis. The cybersecurity service 22, for example, may maintain an agent-to-node mapping 70 that identifies which cybersecurity sensory agent 54a-N is assigned to its corresponding sensory nodal server 52. The agent-to-node mapping 70, in particular, may associate the cybersecurity sensory agent identifier 56a-N to the IP address 72a-M assigned to the corresponding sensory nodal server 52a-M. The networked members 32 may thus access and read the agent-to-node mapping 70 to route each event stream 40a-N to its dedicated/exclusive/sole sensory nodal server 52a-M. Again, because the cloud computing environment 30 may serve millions of client devices 24a-N and their corresponding cybersecurity sensory agents 54a-N, the cybersecurity service 22 may include thousands or millions of the sensory nodal servers 52a-M. Each sensory nodal server 52a-M may be dedicated to centralized storage of the event streams 40 associated with one or many cybersecurity sensory agents 54a-N.

FIGS. 6-9 illustrate examples of multi-modal queries 80 in the digital cybersecurity system/service 20/22. Because the sensory nodal server 52 may be the sole, centralized repository for the events/streams 38/40 associated with the cybersecurity sensory agent 54, the sensory nodal server 52 may be a network resource for other networked members 32 also providing portions of the digital cybersecurity service 22. A networked member 32, for example, may query the sensory nodal server 52 for the events/streams 38/40 of current and/or historical interest. The sensory nodal server 52 retrieves the events/streams 38/40 from local memory and sends the events/streams 38/40, for example, back to the networked member 32. The networked member 32 may then analyze the events/streams 38/40 to help detect the abnormal operation 36, and thus perhaps cybersecurity threats 26, occurring at the client device 24. Because the sensory nodal server 52 provides an agent-specific event repository for the digital cybersecurity system/service 20/22, the sensory nodal server 52 is capable of receiving and concurrently processing the multi-modal queries 80. Simply put, each multi-modal query 80 is confined to, and never leaves, the sandboxed sensory nodal server 52.

Figure 7:
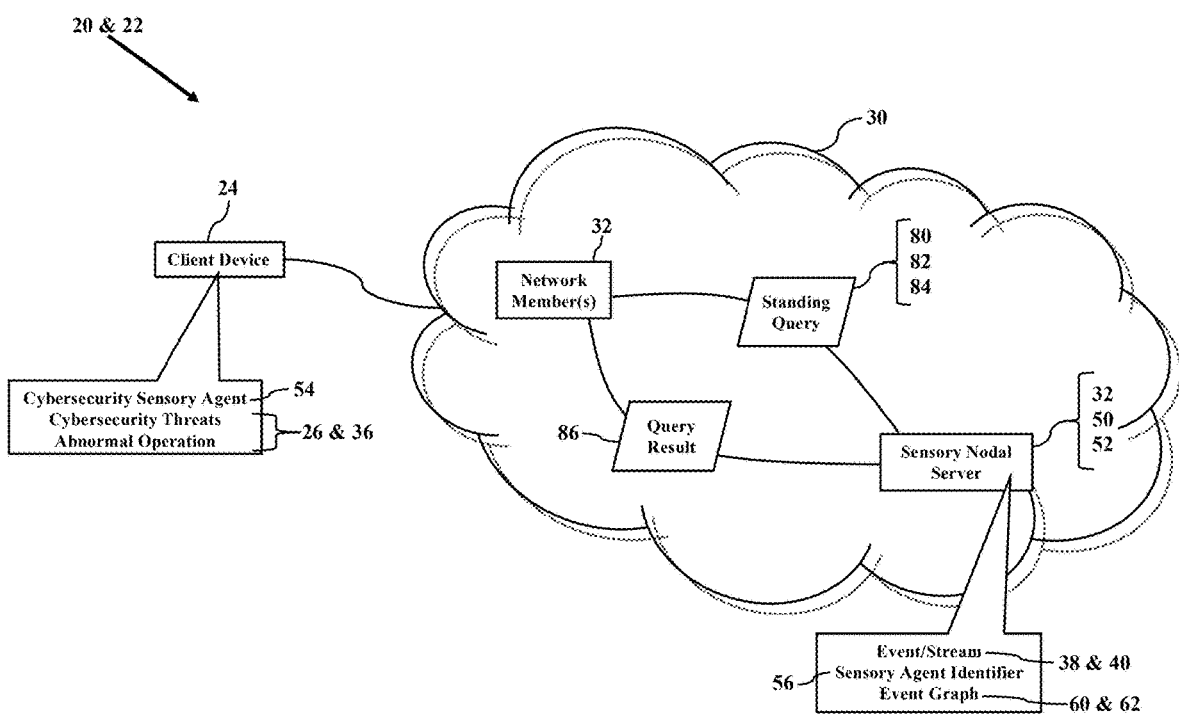

FIG. 7, for example, illustrates a standing query 82. The standing query 82 is an example of the multi-modal query 80 processed by the sensory nodal server 52. Whatever networked member 32 sends the multi-modal query 80, the sensory nodal server 52 may determine the multi-modal query 80 is the standing query 82 when requesting real time events 38 as they are received/processed/stored by the sensory nodal server 52. The networked member 32 sends the multi-modal query 80 to the sensory nodal server 52 that is responsible for locally storing the event streams 40 associated with the cybersecurity sensory agent 54. The multi-modal query 80 may also specify a query parameter 84 (such as a specific event 38 or sequence/series/pattern/ combination of events 38). When the sensory nodal server 52 receives the multi-modal query 80 and determines the standing query 82, the sensory nodal server 52 installs the standing query 82. The dedicated sensory nodal server 52 inspects all the incoming events 38 for matches to the query parameter 84 specified by the query 80/82. The sensory nodal server 52 may further repetitively/periodically execute the standing query 82, perhaps according to a calendar or timing interval (such as every minute). Each time the sensory nodal server 52 determines a match with the query parameter 84, for example, the sensory nodal server 52 generates a copy of the matching event/events 38 and sends the copy as a query result 86. While the query result 86 may be sent to any destination, FIG. 7 illustrates a simple example of the query result 86 routing back via the cloud computing environment 30 to the network address (e.g., IP address) associated with the requestor (e.g., the networked member 32). The networked member 32 may then analyze the query result 86 to help detect abnormal operation 36, and thus perhaps cybersecurity threats 26, occurring at the client device 24. The standing query 82 is more fully explained by U.S. patent application Ser. No. 17/325,097, which has since issued as U.S. Pat. No. 11,836,137, and incorporated herein by reference in its entirety.

Figure 8:
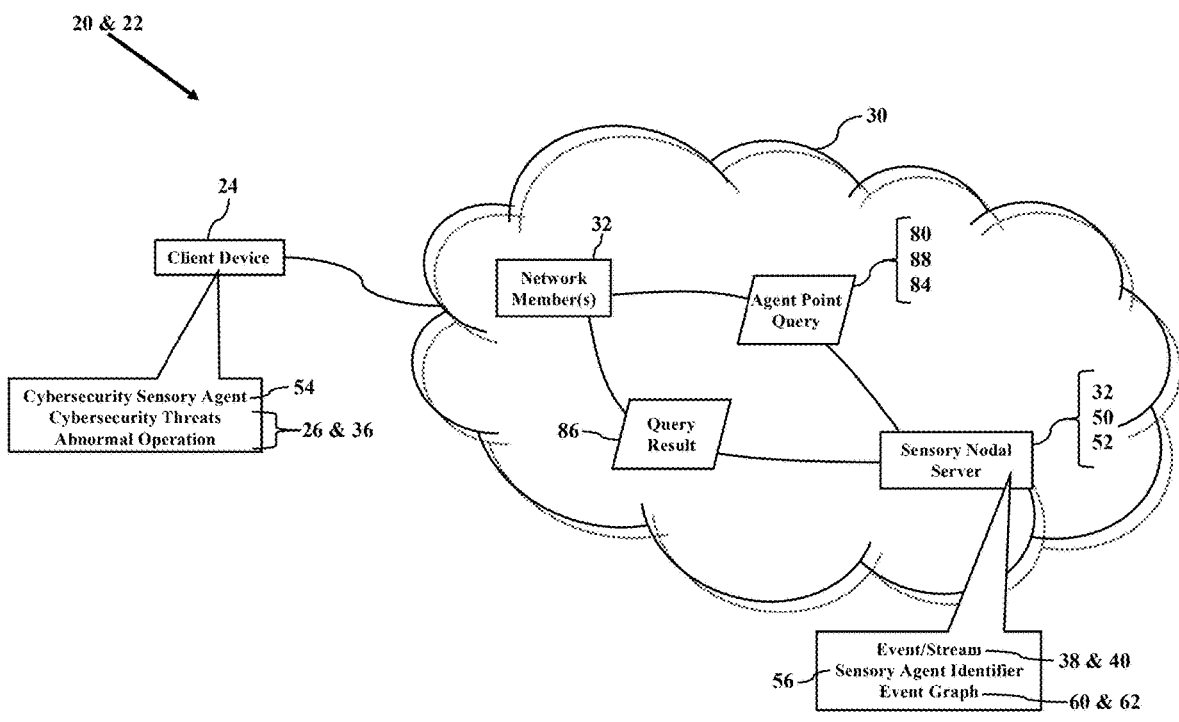

FIG. 8, as another example, illustrates an agent point query 88. The agent point query 88 is another example of the multi-modal query 80 processed by the sensory nodal server 52. The sensory nodal server 52 is constantly receiving the events 38 streamed (e.g., the event stream 40) from the client device 24 executing the cybersecurity sensory agent 54. Whatever networked member 32 sends the multi-modal query 80, the sensory nodal server 52 may determine the multi-modal query 80 is the agent point query 88 when requesting a one-time specific event 38, or a specific sequence/series/pattern/combination of events 38. The agent point query 88 may thus be a pin-pointed query that fetches only the requested event/stream 38/40 associated with the cybersecurity sensory agent 54 (e.g., the cybersecurity sensory agent identifier or "AID" 56). The agent point query 88 may also specify its corresponding query parameter 84. When the sensory nodal server 52 determines the agent point query 88, the sensory nodal server 52 inspects all the incoming events 38 for matches to the query parameter 84 specified by the agent point query 88. When the sensory nodal server 52 determines a match with the query parameter 84, the sensory nodal server 52 generates the copy of the matching event/stream 38/40 and sends the copy as the query results 86 back to the networked member 32. The networked member 32 may then analyze the event/stream 38/40 to help detect abnormal operation 36, and thus perhaps cybersecurity threats 26, occurring at the client device 24. The agent point query 88 may thus be configured as a single, one-time query to retrieve matching event(s) 38 (perhaps as opposed to the periodic standing query 82 illustrated in FIG. 7).

The agent point query 88, as an example, may request data associated with the event graph 62. The sensory nodal server 52, as previously explained, may generate the event graph 62 using the events 38 streamed to, and locally stored by, the sensory nodal server 52. The sensory nodal server 52 uses the event graph 62 to detect evidence of cybersecurity threats 26 affecting or infecting the client device 24. The sensory nodal server 52, as examples, may process the agent point query 88 to answer queries from the networked member 32, with a low response time (due to entirely local stored of the event graph 62). The agent point query 88, as examples, may specify process requests (such as "fetch this process" or "find the events associated with this process"). A "context graph" agent point query 88, as another example, may specify a starting vertex in the event graph 62 (such as a software process). The sensory nodal server 52 may then traverse the event graph 62 and very efficiently return all the associated subgraphs around that node (such as domains contacted, users logged in, and networked communications).

Figure 6:
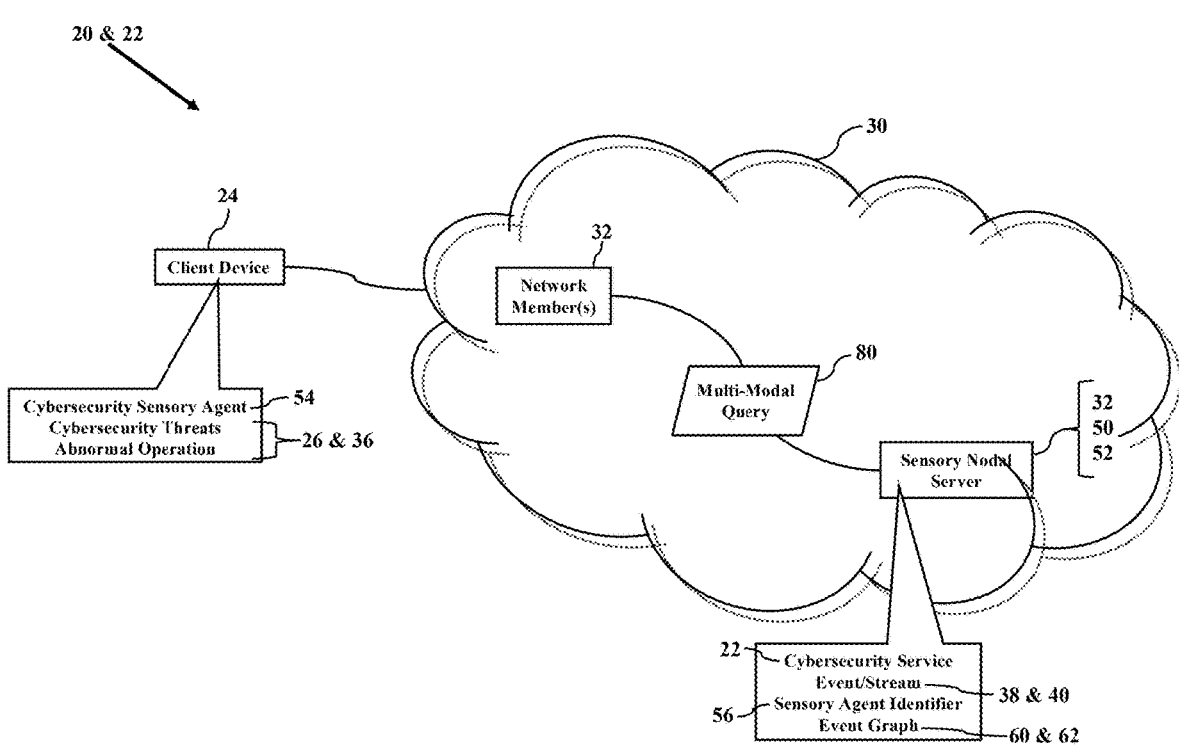
FIGS. 6-9 illustrate examples of the multi-modal queries.
Figure 9:
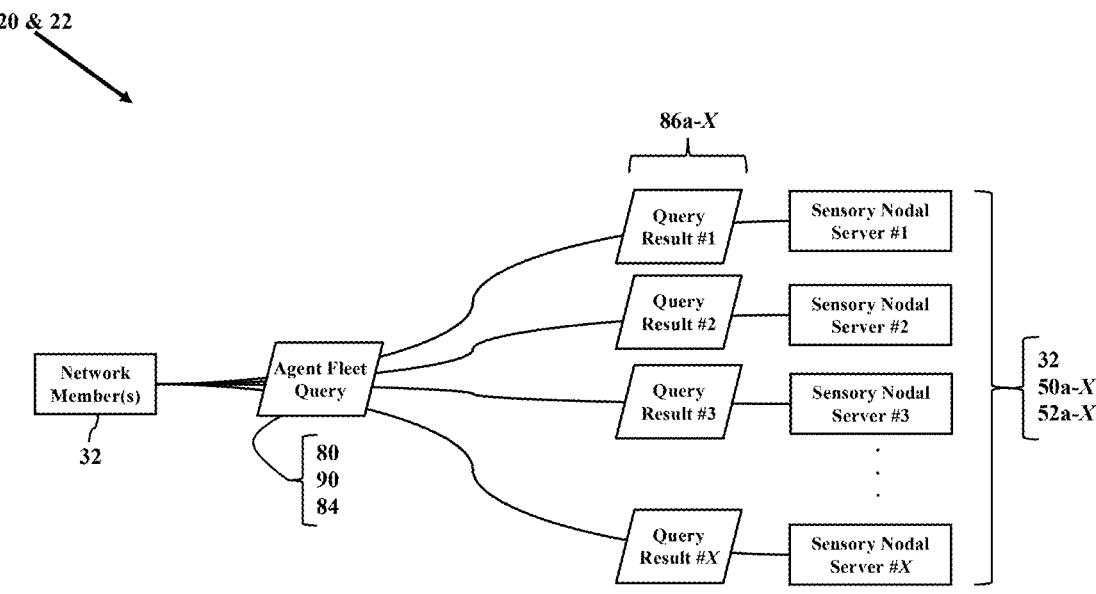

FIG. 9, as yet another example, illustrates an agent fleet query 90. The agent fleet query 90 is still another example of the multi-modal query 80 processed by the sensory nodal server 52. Whatever networked member 32 sends the multi-modal query 80, the sensory nodal server 52 may determine the multi-modal query 80 is the agent fleet query 90 based on the cybersecurity sensory agent identifier(s) 56 specified as the query parameter(s) 84. The agent fleet query 90, for example, represents a one-off (i.e., single use) query that is executed by multiple sensory nodal servers 52. The agent fleet query 90, in other words, requests the event(s)/ stream(s) 38/40 that is/are associated with their corresponding multiple cybersecurity sensory agents 54 (as illustrated in FIG. 6). The agent fleet query 90 may thus request the query results 86 from a batch of the sensory nodal servers 52a-X. The networked member 32, for example, generates and sends the agent fleet query 90, and the agent fleet query 90 is routed to each sensory nodal server 52 locally storing the electronic data 28 that is associated with a group or batch of the cybersecurity sensory agents 54. When each sensory nodal server 52 receives the agent fleet query 90, each sensory nodal server 52 inspects its incoming event(s)/ stream(s) 38/40 for matches to the query parameter 84 specified by the agent fleet query 90. When the sensory nodal server 52 determines a match with the query parameter 84, the sensory nodal server 52 generates the copy of the matching event(s)/stream(s) 38/40 and sends the copy as the query result 86 back to the networked member 32. The networked member 32 may then analyze the matching event(s)/stream(s) 38/40 to help detect abnormal operation 36, and thus perhaps cybersecurity threats 26, associated with multiple cybersecurity sensory agents 54. The networked member 32 may thus use the agent fleet query 90 to retrieve search results from some or all of the sensory nodal servers 52.

The agent fleet query 90 is simple and effective. The agent fleet query 90, for example, may specify a pattern as the query parameter 84. A revealing data science use case, for example, may request that a specified fleet of the sensory nodal servers 52 find data in the event graph 62 where a particular pattern of the events 38 occurred within the last hour. As another example, the agent fleet query 90 may request every instance of a running JAVA® process with Log4Shell vulnerable system properties on the command line. Whichever sensory nodal server 52 receives the agent fleet query 90, that sensory nodal server 52 also executes the agent fleet query 90, perhaps via a simple streaming interface. The sensory nodal server 52 collects the search results and sends/streams the query result 86 (perhaps to a single destination, such as the requesting networked member 32).

Figure 10:
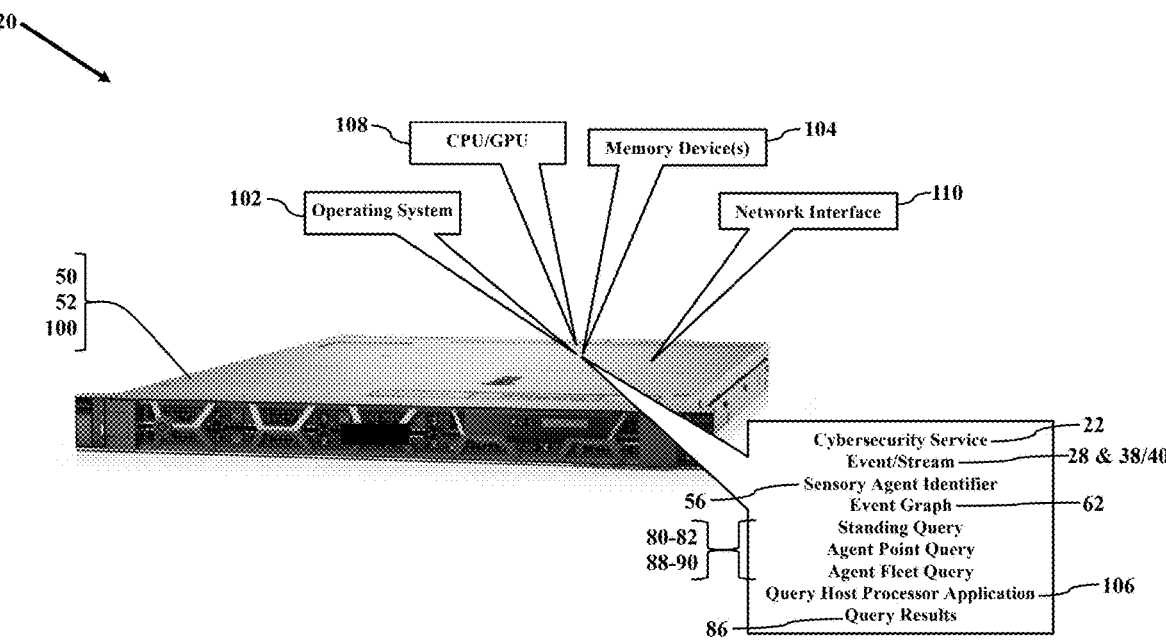
FIG. 10 illustrates more detailed examples of the sensory nodal server concurrently executing the multi-modal queries.

FIG. 10 illustrates more detailed examples of the sensory nodal server 52 concurrently executing the multi-modal queries 80. FIG. 10 illustrates the sensory nodal server 52 as a rack server 100, which is commonly installed in server rooms and in server farms. The server 52/100 is programmed to provide the digital cybersecurity service 22 by locally storing and analyzing the data/event(s)/stream(s) 28/38/40 associated with the cybersecurity sensory agent identifier 56 (and thus also the corresponding cybersecurity sensory agent 54, as explained with reference to FIGS. 3-8). The server 52/100 is also programmed to execute the multi-modal queries 80, based on the locally stored data/event(s)/stream(s) 28/38/40. The server 52/100 stores and executes an operating system 102 in a local memory device 104. The server 52/100 also stores a cybersecurity query host processor application 106 in the memory device 104. The server 52/100 has a hardware processor with cores 108 (illustrated as "CPU/GPU") that reads and executes the operating system 102 and the query host processor application 106. The server 52/100 also has network interfaces 110 to multiple communications networks (such as the cloud computing environment 30 illustrated in FIGS. 1-4 & 6-8), thus allowing bi-directional communications with other networked devices and services (such as the networked members 32 illustrated in FIGS. 1-9). The query host processor application 106 has programming code or instructions that cause the server 52/100 to perform operations, such as receiving and concurrently executing the multi-modal queries 80 and searching the locally-stored events 38 and/or the event graph 62. The query host processor application 106 thus programs the server 52/100 as a multi-modal query handler engine that searches the locally-stored events 38 and/or the event graph 62 for near real time query results 86.

Computer functioning is greatly improved. The server 52/100 may concurrently process and execute the standing query 82, the agent point query 88, and the agent fleet query 90. One or more of the different networked members 32 (illustrated in FIGS. 1-9) may query the sensory nodal server 52, and the query host processor application 106 instructs or causes the server 52/100 to concurrently execute the multi-modal queries 80 against its locally-stored events 38 and event graph 62 (perhaps using the cybersecurity sensory agent identifier 56 as one of the query parameters 84, as explained with reference to FIGS. 7-9). Because the server 52/100 stores the single/sole data representation for the data/event(s)/stream(s)/graph 28/38/40/92 associated with the corresponding cybersecurity sensory agent 54, the server 52/100 may analyze the events 38 and event graph 62 in near or substantially real time with the client device 24. Moreover, again because the server 52/100 locally and entirely stores the events 38 and the event graph 62 in the local, on-disk memory device 104, the server 52/100 may receive and answer the multi-modal queries 80 in near or substantially real time with the events 38 occurring at the client device 24. The server 52/100, in other words, processes the multi-modal queries 80 and generates the query results 86 without the need for subqueries or network communications to other databases and networked members 32. Simply put, the server 52/100 makes the electronic data/events 38 available in near real-time (e.g., within seconds or less of being ingested) with substantially reduced network latency or delay.

Computer functioning is further improved. The digital cybersecurity system/service 20/22 implements the server 52/100 to allow multiple different modalities (e.g., the multi-modal queries 80) for interacting with the same underlying electronic data 28. The single host server 52/100, in other words, both locally stores the events 38 and answers the multi-modal queries 80, thus reducing hardware/memory resources, network resources, and electrical power consumption. The digital cybersecurity system/service 20/22, for example, partitions the incoming event streams 40 according to the cybersecurity sensory agent 54 and/or the cybersecurity sensory agent identifier 56. Rather than communicating with a separate database over a network, the digital cybersecurity system/service 20/22 tasks the host server 52/100 with exclusively maintaining an original local copy of this event data in-memory and on-disk (the cybersecurity system 22, however, may also maintain a separate, duplicate copy at a different network location for redundancy protection). The digital cybersecurity system/service 20/22 performs a single data save to the host server 52/100, and the same host server 52/100 may process the multi-modal query 80. Each cybersecurity sensory agent 54, in other words, maps to exactly one sensory nodal server 52/100 (such as via the agent-to-node mapping 70, as explained with reference to FIG. 5). The sensory nodal server 52/100 is thus the authoritative service/network source for the electronic data 28 about that cybersecurity sensory agent 54. The digital cybersecurity system/service 20/22 thus significantly reduces network latency, which greatly reduces the time for analysis and for detection of the cybersecurity threats 26. Moreover, because less network connections and hardware resources are required, less electrical power is consumed.

The digital cybersecurity system/service 20/22 implements an elegant multi-modal query capability. The server 52/100, for example, runs the standing query 82 and continually monitors the incoming data/events 38/40 for matches and continually produces output (such as, for example, "find all powershell.exe processes with a non-null HostURL field"). The server 52/100, however, also concurrently runs the agent point query 88 and the agent fleet query 90. The agent point query 88 and the agent fleet query 90 are thus request-based, non-streaming queries. The agent point query 88 requests single data lookups or local traversals of the event graph 62 using the electronic data 28 locally stored on the nodal server 52/100 (again perhaps using the agent-to-node mapping 70). The agent fleet query 90, though, may request the electronic data 28 across a set (e.g., some or all) of the servers 52 (as explained with reference to FIG. 9). The digital cybersecurity system/service 20/22, for example, may use the agent-to-node mapping 70 to target the agent fleet queries 90 according to the desired or targeted cybersecurity sensory agents 54. The agent fleet query 90, for example, may concurrently request searches for particular patterns of the events 38 sent from all cybersecurity sensory agents 54 or from a subset of the cybersecurity sensory agents 54 (such as those cybersecurity sensory agents 54 that are affiliated with a customer/user/company identifier). The digital cybersecurity system/service 20/22 thus architects and executes multiple different styles of query (streaming, point, fleet) on one nodal server 52/100. The nodal server 52/100, furthermore, is programmed to execute both lookup queries and graph traversals within the same system. The nodal server 52/100, still further, executes all of the multi-modal queries 80 while locally maintaining the one copy of the electronic data 28 partitioned according to the cybersecurity sensory agent 54. The nodal server 52/100, in addition, may concurrently execute the multi-modal queries 80 at cybersecurity scale (that is, trillions of events 38 per day on over a petabyte of data). The nodal server 52/100 executes the multi-modal queries 80 in real-time or near-real time while still ingesting data.

Figure 11:
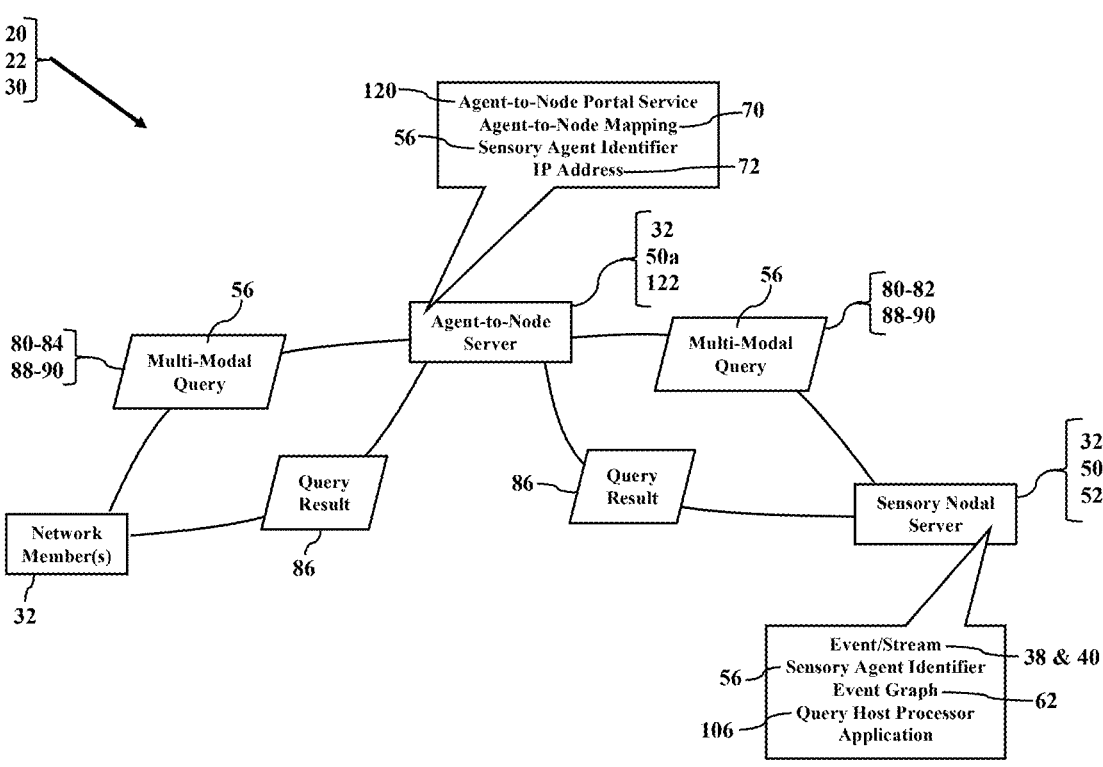
FIGS. 11-15 illustrate examples of agent-to-node mapping.
Figure 12:
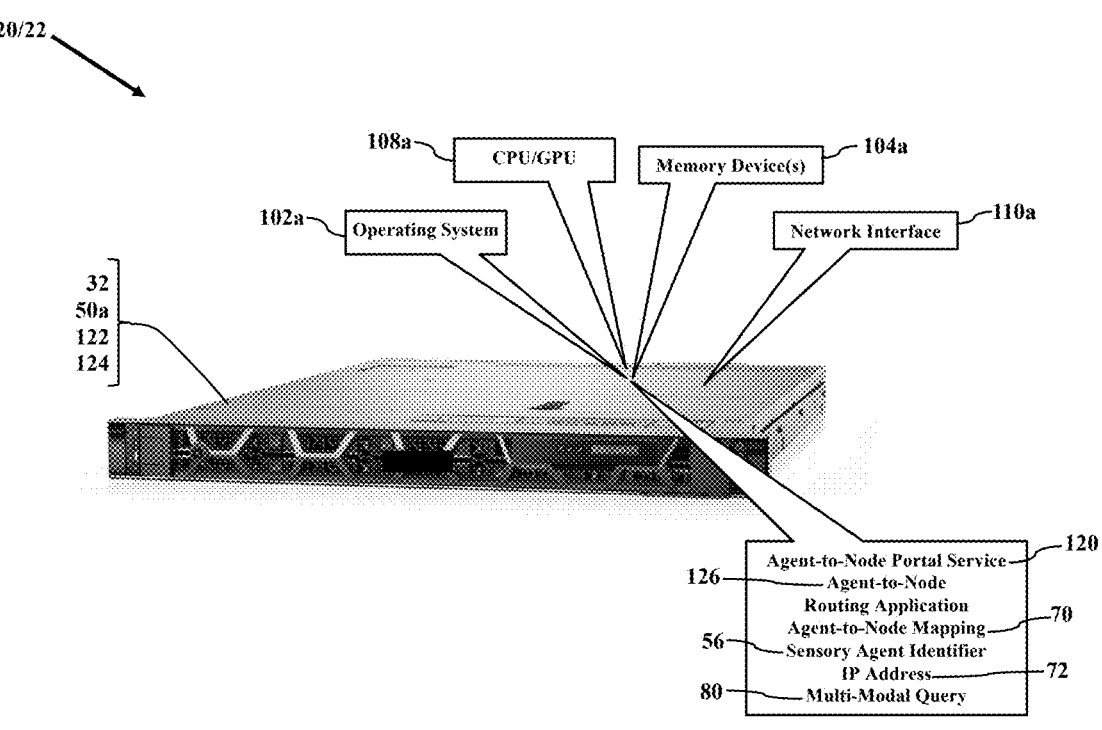

FIGS. 11-14 illustrate more examples of the agent-to-node mapping 70. The cloud computing environment 30 maintains the agent-to-node mapping 70 to identify the sensory nodal server 52 assigned to the electronic data/events 28/38 associated with the cybersecurity sensory agent identifier 56 (and streamed from the client device 24 hosting the corresponding cybersecurity sensory agent 54, as explained with reference to FIGS. 3-8). FIG. 11, for example, illustrates the agent-to-node mapping 70 as a cloud resource available to the networked members 32 providing the cybersecurity service 22. The digital cybersecurity system/service 20/22, for example, may have an agent-to-node portal service 120 that receives the multi-modal queries 80 from the networked member 32. Whatever the query type (such as the standing query 82, the agent point query 88, and/or the agent fleet query 90), the cloud computing environment 30 may route the multi-modal query 80 to the agent-to-node portal service 120. The agent-to-node portal service 120 may function as a gateway, entry, or interface for digital cybersecurity system/service 20/22 (such as, for example, by using application programming interfaces). The agent-to-node portal service 120, for example, is provided by a computer system 50a programmed to implement the agent-to-node mapping 70. FIGS. 11-12 illustrate the computer system 50a as an agent-to-node server 122, but the computer system 50a may be other processor-controlled devices. The agent-to-node server 122, as yet another networked member 32 of the cloud computing environment 30, may thus be tasked with receiving and routing the multi-modal queries 80 sent from other networked members 32. FIG. 12, as another example, illustrates the agent-to-node server 122 as another rack server 124 having the hardware processor 108a and the memory device 104a that stores and executes an agent-to-node routing application 126. The agent-to-node routing application 126 is software programming, code, or instructions that cause the agent-to-node server 122 to perform operations, such as determining which of the many sensory nodal servers 52 locally stores the events 38 streamed from particular ones of the cybersecurity sensory agents 54 (as explained with reference to FIG. 5). When the agent-to-node server 122 receives the multi-modal query 80, the agent-to-node routing application 126 causes or instructs the agent-to-node server 122 to read the cybersecurity sensory agent identifier 56 specified by the multi-modal query 80 (perhaps as one of the query parameters 84). Because the multi-modal query 80 may fail to specify the network location (such as the IP address 72) assigned to the exact, dedicated sensory nodal server 52, the multi-modal query 80 may only specify the cybersecurity sensory agent identifier 56 associated with the events 38 or the event graph 62 of interest.

Figure 13:
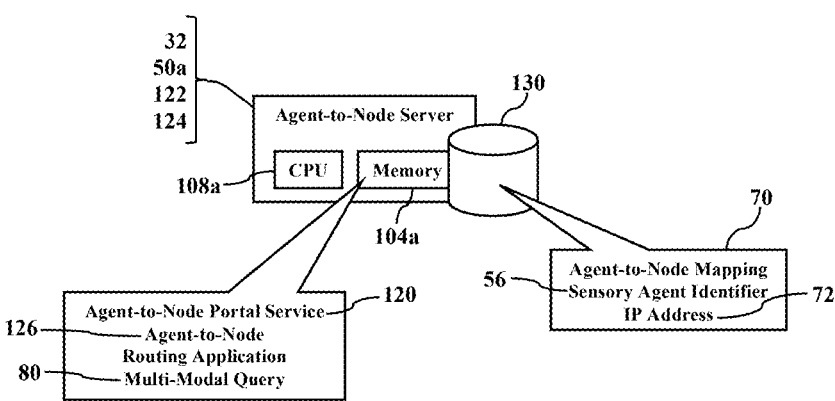
Figure 14:
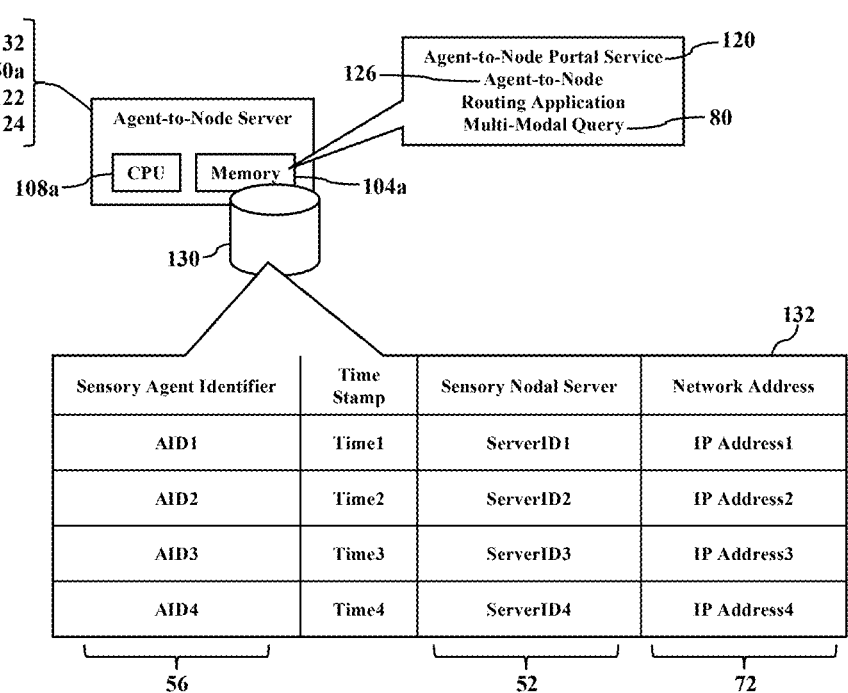

FIGS. 13-14 illustrate routing information. The agent-to-node portal service 120 may provide routing instructions based on the cybersecurity sensory agent identifier (or "AID") 56. When the agent-to-node server 122 receives the multi-modal query 80, the agent-to-node routing application 126 instructs or causes the agent-to-node server 122 to read the cybersecurity sensory agent identifier 56 specified by the multi-modal query 80. The agent-to-node routing application 126 instructs or causes the agent-to-node server 122 to query the agent-to-node mapping 70. While the agent-to-node mapping 70 may have other logical structures, a relational database is perhaps easiest to understand. FIG. 13 thus illustrates the agent-to-node mapping 70 as an electronic database 130 that is locally stored in the memory device 104a of the agent-to-node server 122. FIG. 14 illustrates the agent-to-node mapping 70 as a routing table 132 having row and columnar database entries that map, relate, convert, or associate different cybersecurity sensory agent identifiers 56 to their corresponding sensory nodal servers 52 and IP addresses 72. So, when the agent-to-node server 122 receives the multi-modal query 80, the agent-to-node server 122 is programmed to acquire the cybersecurity sensory agent identifier 56 and query the agent-to-node mapping 70 for the corresponding IP address 72 assigned to the dedicated sensory nodal server 52. When the agent-to-node server 122 identifies the dedicated network location for log records associated with the cybersecurity sensory agent identifier 56, the agent-to-node routing application 126 instructs or causes the agent-to-node server 122 to route the multi-modal query 80 to the IP address 72 assigned to the correct, dedicated sensory nodal server 52. The dedicated sensory nodal server 52 may then process the multi-modal query 80 and generate the query result 86 (as explained with reference to FIGS. 6-9).

Figure 15:
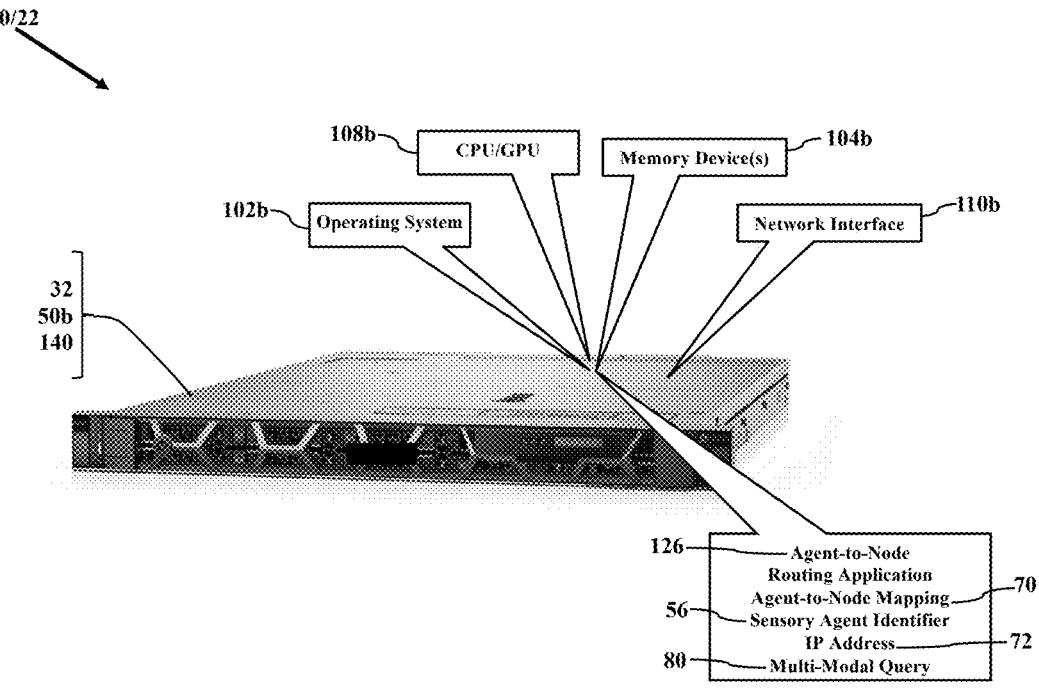

FIG. 15 illustrates still more examples of the agent-to-node mapping 70. Here the networked member 32 itself may consult the agent-to-node mapping 70. Because the agent-to-node mapping 70 may be a cloud resource available to the networked members 32 providing the cybersecurity service 22, the networked members 32 may themselves determine the IP address 72 assigned to the dedicated sensory nodal server 52. FIG. 15 thus illustrates a simple example of local destination determination. The networked member 32, for example, may locally store an electronic copy of the agent-to-node mapping 70. Because the networked member 32 is another computer system 50b, FIG. 15 illustrates the networked member 32 as another rack server 140 having the hardware processor 108b and the memory device 104b that stores and executes the agent-to-node routing application 126. When the networked member 32 generates the multi-modal query 80, the networked member 32 may execute the agent-to-node routing application 126 to self-determine the correct, dedicated sensory nodal server 52 that stores the log records (such as the events 38 and the event graph 62) associated with the cybersecurity sensory agent identifier 56 (such as explained with reference to FIGS. 5 & 10). The networked member 32 queries the agent-to-node mapping 70 for the cybersecurity sensory agent identifier 56 and identifies the corresponding IP address 72 assigned to the dedicated sensory nodal server 52. The agent-to-node routing application 126 instructs or causes the networked member 32 to route the multi-modal query 80 to the IP address 72 assigned to the correct, dedicated sensory nodal server 52. The dedicated sensory nodal server 52 may then process the multi-modal query 80 and generate the query result 86 (as explained with reference to FIGS. 6-9).

Figure 16:
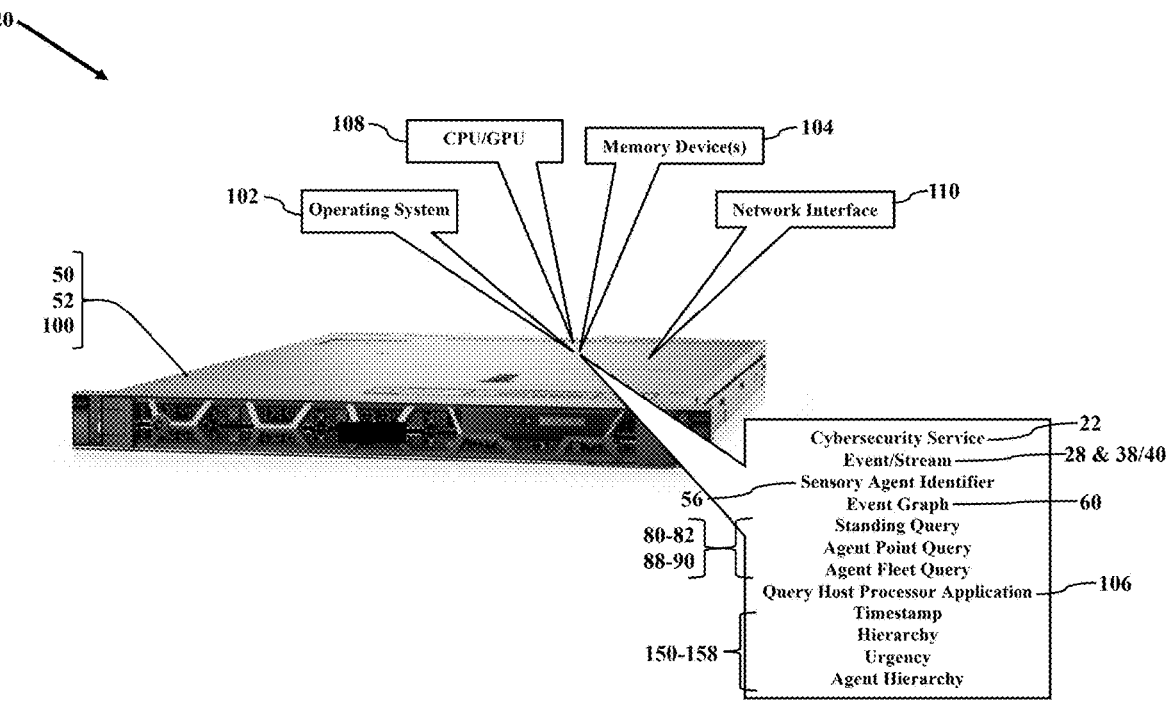
FIG. 16 illustrates examples of query prioritization.

FIG. 16 illustrates examples of query prioritization 150. The sensory nodal server 52 (again illustrated as the rack server 100) may receive and concurrently process the multi-modal queries 80 (such as the standing query 80, the agent point query 88, and the agent fleet query 90). The sensory nodal server 52, however, may be programmed to prioritize execution and/or completion of one or more of the multi-modal queries 80. To perform all these queries 80, 88, and 90, the digital cybersecurity system/service 20/22 may implement query workload management to optimize the most important queries, execute queries in the timeliest fashion possible, and keep any single or subset of queries from preventing the digital cybersecurity system/service 20/22 from doing its job.

The query host processor application 106, as an example, may prioritize the multi-modal queries 80 according to the timestamp 152 (as also illustrated in FIG. 14). Each multi-modal query 80 may be associated with its corresponding time stamp 152. The timestamp 152 may indicate a date and time of generation, receipt, or other relative chronological measure. Whatever the timestamp 152, the query host processor application 106 may cause the sensory nodal server 52 to arrange execution/processing/completion of the multi-modal queries 80 based on their corresponding time stamps 152.

The multi-modal queries 80 may be processed and executed according to a hierarchy 154. The standing query 82, as an example, may be ranked higher or more important than the agent point query 88 and the agent fleet query 90. The agent point query 88, as another example, may have a lowest or least hierarchical ranking. The query host processor application 106 may thus cause the sensory nodal server 52 to arrange execution/processing/completion of the multi-modal queries 80 based on the hierarchy 154.

The multi-modal queries 80 may be processed and executed according to an urgency 156. As the sensory nodal server 52 receives and concurrently processes the multi-modal queries 80 (such as the standing query 82, the agent point query 88, and the agent fleet query 90), one or some multi-modal queries 80 may be tagged, labeled, designated, or otherwise indicated as urgent. The query host processor application 106 may thus cause the sensory nodal server 52 to elevate or advance execution/processing/completion of the urgent multi-modal query 80, thus allowing the urgency 156 to leapfrog other multi-modal queries 80.

The multi-modal queries 80 be processed and executed according to an agent hierarchy 158. Some cybersecurity sensory agents 54, for example, may monitor important client devices 24 (such as fail-safe cloud services and vital/emergency networks). Whatever the reason(s), some client devices 24, and thus their corresponding cybersecurity sensory agents 54, may have prioritized or urgent cybersecurity sensory agent identifiers 56. So, should the sensory nodal server 52 serve as dedicated network storage for multiple cybersecurity sensory agents 54, the query host processor application 106 may thus cause the sensory nodal server 52 to always dedicate available hardware and memory resources to the multi-modal queries 80 specifying urgent cybersecurity sensory agent identifiers 56. Each cybersecurity sensory agent identifier 56 may thus be assigned and associated with the sensory agent hierarchy 158 (such as numerical scale 10). The cybersecurity sensory agent 54, and its associated cybersecurity sensory agent identifier 56, ranked highest or #1, for example, may be prioritized for available hardware and memory resources. Other multi-modal queries 80, specifying less urgent cybersecurity sensory agent identifiers 56 (such as ranked #2-10), may be delayed and processed according to their agent hierarchy 158.

Figure 17:
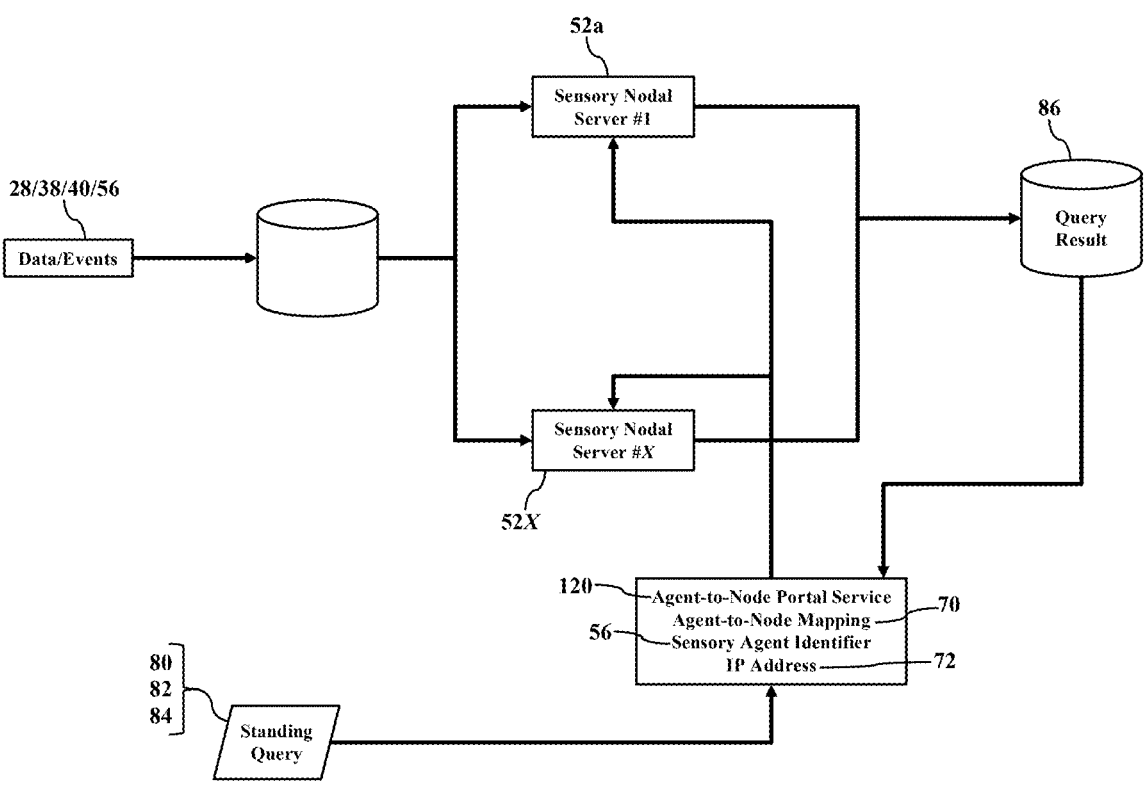
FIGS. 17-19 illustrate more detailed examples of the multi-modal queries.
Figure 18:
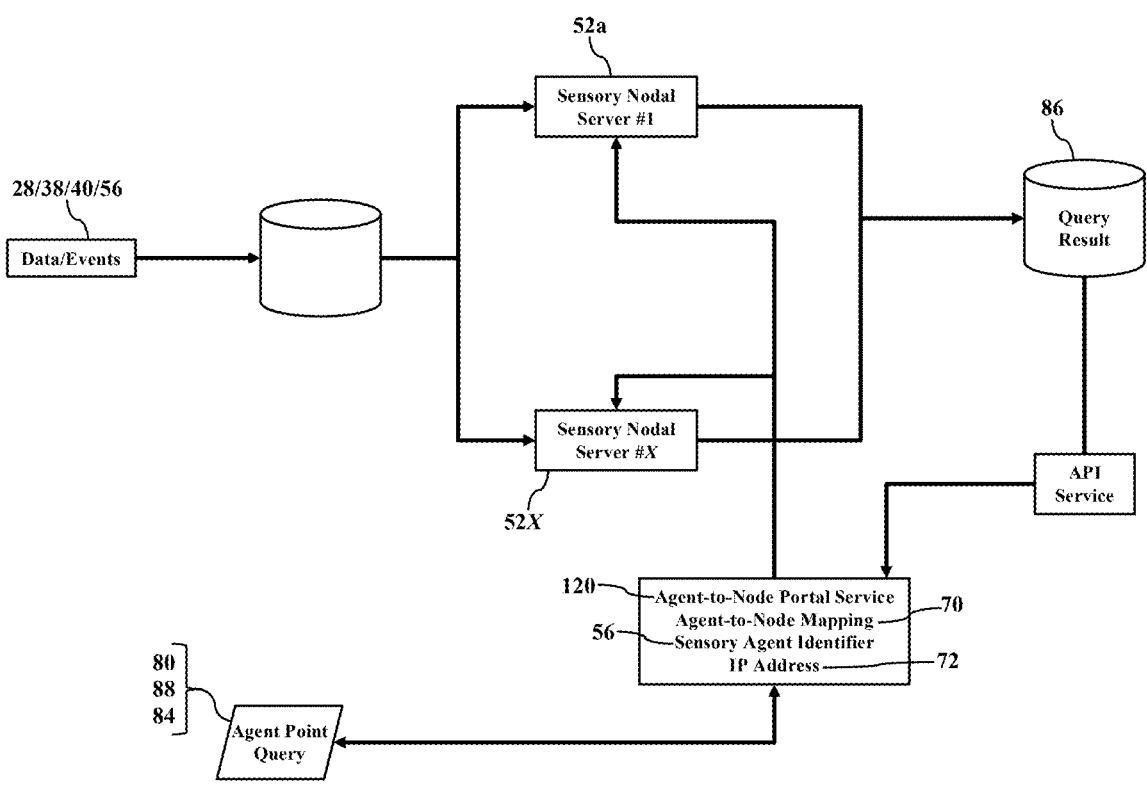
Figure 19:
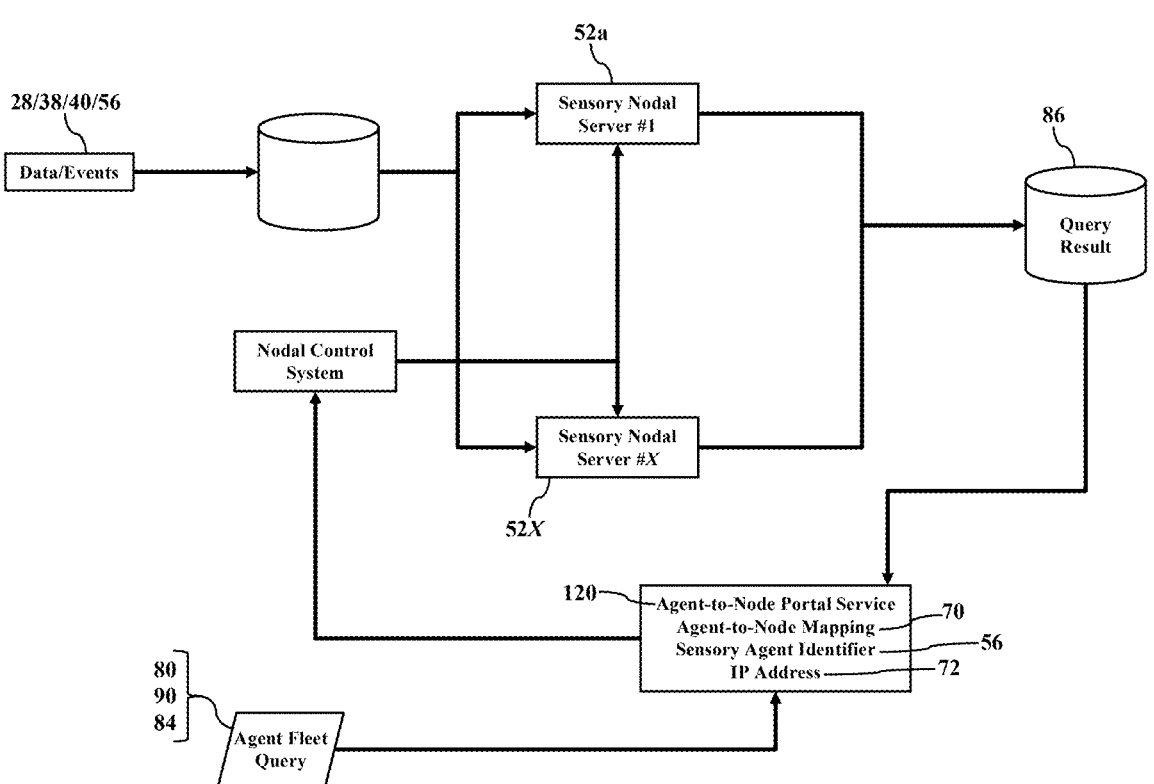

FIGS. 17-19 illustrate more detailed examples of the multi-modal queries 80. The digital cybersecurity system/service 20/22 ingests and stores the electronic data 28 (such as the events 38) sent from the client devices 24 hosting the cybersecurity sensory agents 54 (as previously explained). The digital cybersecurity system 20/service 22 routes the data/events 28/30 to their corresponding dedicated sensory nodal server 52a-X based on the cybersecurity sensory agent identifier 56 (as previously explained). FIG. 17, for example, illustrates the dedicated sensory nodal server 52 processing the standing query 82. The standing query 82 originates from a requesting device (not shown for simplicity). The standing query 82 may request real time events 38 as they are received/processed/stored by the sensory nodal server 52. The agent-to-node portal service 120 receives the standing query 82 and consults the agent-to-node mapping 70 for destination routing information. The agent-to-node portal service 120 determines which of the many sensory nodal servers 52 is dedicated to locally storing the data/events 28/38/40, based on the cybersecurity sensory agent identifier 56 and/or the query parameter 84 specified by the standing query 82. The agent-to-node portal service 120 then sends/forwards the standing query 82 to the sensory nodal server 52 that is responsible for locally storing the data/event/stream 28/38/40 associated with the cybersecurity sensory agent 54. When the sensory nodal server 52 receives and installs the standing query 82, the sensory nodal server 52 periodically/recurringly inspects the incoming data/event/stream 28/38/40 for matches to the query parameter 84 specified by the standing query 82. The sensory nodal server 52 then sends the query result 86 to a service/network destination (such as a database or other storage collector). The digital cybersecurity system/service 20/22, for example, may send the query result 86 back to the agent-to-node portal service 120, and the agent-to-node portal service 120 may send the query result 86 back to the requesting device.

FIG. 18 illustrates the dedicated sensory nodal server 52 processing the agent point query 88. The agent point query 88 is another example of the multi-modal query 80 concurrently processed by the sensory nodal server 52. The agent point query 88 originates from a requesting device (not shown for simplicity). The agent point query 88, for example, requests a specific data/event/stream 28/38/40 associated with the cybersecurity sensory agent 54 (e.g., the cybersecurity sensory agent identifier 56). The agent point query 88 may also specify its corresponding query parameter 84. The agent-to-node portal service 120 receives the agent point query 88 and consults the agent-to-node mapping 70 for destination routing information. The agent-to-node portal service 120 determines which of the many sensory nodal servers 52 is dedicated to locally storing the data/events 28/38/40, based on the cybersecurity sensory agent identifier 56 and/or the query parameter 84 specified by the agent point query 88. The agent-to-node portal service 120 then sends/forwards the agent point query 88 to the sensory nodal server 52 that is responsible for locally storing the data/event/stream 28/38/40 associated with the cybersecurity sensory agent 54. When the sensory nodal server 52 receives the agent point query 88, the sensory nodal server 52 inspects its local memory and/or the incoming data/event/stream 28/38/40 for matches to the query parameter 84 specified by the agent point query 88. The sensory nodal server 52 then sends the query result 86 to a service/network destination (such as a database or other storage collector). The sensory nodal server 52, for example, may send the query result 86 to an API service for further formatting and processing (perhaps according to an application programming interface). The API service may then send the query result 86 to the agent-to-node portal service 120, and the agent-to-node portal service 120 may send the query result 86 back to the requesting device.

FIG. 19 illustrates the dedicated sensory nodal server 52 processing the agent fleet query 90. The agent fleet query 90 is another example of the multi-modal query 80 concurrently processed by the sensory nodal server 52. The agent fleet query 90 originates from a requesting device (not shown for simplicity). The agent fleet query 90, for example, represents a one-off (i.e., single use) query that is executed by multiple sensory nodal servers 52*a*-X. The agent fleet query 90 may also specify its corresponding query parameter 84. The agent-to-node portal service 120 receives the agent fleet query 90 and consults the agent-to-node mapping 70 for destination routing information. The agent-to-node portal service 120 determines which of the sensory nodal servers 52 is dedicated to locally storing the data/events 28/38/40, based on the cybersecurity sensory agent identifier 56 and/or the query parameter 84 specified by the agent fleet query 90. The agent-to-node portal service 120, for example, determines the IP addresses 72 that are assigned to the sensory nodal servers 52. The agent-to-node portal service 120 then sends/forwards the agent fleet query 90 to a nodal control system that disperses the agent fleet query 90 to the IP addresses 72. When the sensory nodal servers 52 receive the agent fleet query 90, each sensory nodal server 52 inspects its local memory and/or the incoming data/event/stream 28/38/40 for matches to the query parameter 84 specified by the agent fleet query 90. Each sensory nodal server 52 then sends its query result 86 to a service/network destination (such as a database or other storage collector). The individual portions of the query results 86 (generated by each sensory nodal server 52), for example, may be collected and aggregated into a single query result 86. The digital cybersecurity system/service 20/22, for example, may send the individual or aggregated query result 86 back to the agent-to-node portal service 120, and the agent-to-node portal service 120 may send the query result 86 back to the requesting device.

The agent-to-node portal service 120 greatly simplifies and speeds the digital cybersecurity service 22. The networked members 32 of the cybersecurity system 20 and the cloud computing environment 30 may merely issue the multi-modal queries 80 without knowledge of storage routing information. The networked members 32, for example, need only specify the cybersecurity sensory agent(s) 54 of interest (using their corresponding cybersecurity sensory agent identifier(s) 56). The networked members 32 need not pre-determine the dedicated nodal storage server 52 and its corresponding network address. The networked members 32 may provide their roles/functions in the digital cybersecurity service 22 without storing or locating the dedicated nodal storage server 52. The networked members 32 generate their multi-modal queries 80 and rely on the agent-to-node portal service 120 for routing details. The digital cybersecurity service 22 locates the correct, dedicated nodal storage server 52, queries nodal storage server 52, and collects the query results 86. The multi-modal queries 80, as examples, may specify the cybersecurity sensory agent identifier (or AID) 56 and process identifiers (or PIDs) as the query parameters 84. Each PID uniquely identifies a software process detected by the cybersecurity sensory agent(s) 54 (such as via event notifications from client-side operating systems). The agent-to-node portal service 120 listens for the multi-modal queries 80 from the networked members 32 and reads their query parameters 84 (such as the AID+PID). The agent-to-node portal service 120 determines the dedicated nodal storage server 52 and its network location (such as database shard/node IP address assignments from the agent-to-node mapping 70 and/or the API system). The agent-to-node portal service 120, for example, may translate the AID 56 to the corresponding shard number and determine the IP address 72 of the dedicated nodal storage server 52 which owns that shard. The agent-to-node portal service 120 may then issue a gRPC prefix range request to that dedicated nodal storage server 52 (such as, for example, return rows with prefix between range '[<AID>+0001+<hash(PID)>+0+0000] and [<AID>+0001+<hash(PID)>+1+0002]' aka PID vertices and child/parent edges). When the resulting event rows are determined, the digital cybersecurity service 22 may generate the query results 86 by converting the raw event rows into graphical PID vertices and edges. The digital cybersecurity service 22 may then return the query results 86 to the requestor (such as the API system). The digital cybersecurity service 22 thus handles the dynamic and complicated routing details (such as by using the agent-to-node portal service 120) for greatly simplified and faster query results 86 and cybersecurity detection 60.

The digital cybersecurity service 22 thus automatically provides authoritative storage sourcing information. The digital cybersecurity service 22 establishes each nodal storage server 52 as a new network-accessible query endpoint that provides the ability to process the multi-modal queries 80 and process point lookups and graph traversals for any data on that node. When the multi-modal query 80 requests the agent point query 88, for example, the agent point query 88 requests a given piece of the electronic data 28 (such as the particular event 38 or the event stream 40). However, the requesting device/user (such as the networked member 32) will not know the storage partitioning algorithm and, therefore, will not know where that data 28 lives within the cloud computing environment 30. The digital cybersecurity service 22, however, may use the agent-to-node portal service 120 as a network storage locator to look up (perhaps via APACHE HELIX® cluster management) which dedicated nodal storage server 52 is currently the authorative source for that data 28. Once the dedicated nodal storage server 52, and its network location, is identified (such as via the agent-to-node mapping 70), the digital cybersecurity service 22 may forward the agent point query 88 to the dedicated nodal storage server 52.

The digital cybersecurity service 22 may also implement nodal controls. When the multi-modal query 80 requests the agent fleet query 90, for example, the agent fleet query 90 requests the electronic data 28 from a group or batch of particular cybersecurity sensory agent(s) 54 (by specifying their corresponding cybersecurity sensory agent identifier(s) 56). Indeed, the agent fleet query 90 may specify all or every cybersecurity sensory agent identifier 56 associated with one or more users/customers/employers/companies (such as a customer identifier as one of the query parameters 84). The agent-to-node portal service 120, for example, may translate the AID(s) 56 specified by the agent fleet query 90 to their corresponding database shards and IP address(es) 72. The digital cybersecurity service 22, additionally or alternatively, may utilize the nodal control system (for example, as illustrated in FIG. 19) to distribute the agent fleet query 90. The digital cybersecurity service 22, for example, may add a control stream or other distributed transaction log (perhaps via APACHE KAFKA®) as an input mechanism to which the nodal storage servers 52 monitor and listen. The digital cybersecurity service 22 may send the agent fleet query 90 to the nodal control system, thus allowing each nodal storage server 52 to receive and execute the agent fleet query 90. Each nodal storage server 52 may then stream or output its query result 86 as they become available. Depending on system load and query complexity (as well as optimizations, query hints, and other factors), the agent fleet query 90 could run anywhere from seconds to minutes or hours. The agent fleet query 90 may thus focus on point lookups and graph crawls, which may require added time.

Figure 20:
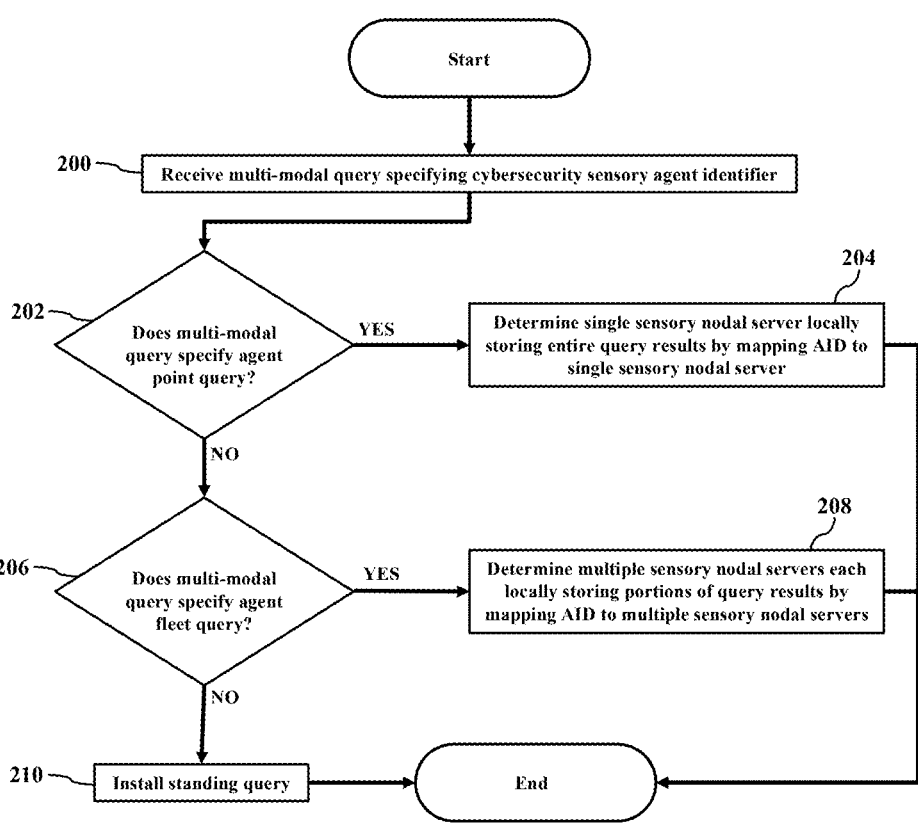
FIGS. 20-21 illustrate examples of methods or operations that locate cybersecurity query results.

FIG. 20 illustrates examples of methods or operations that locate the cybersecurity query results 86. The computer system 50 (such as the dedicated nodal storage server 52) receives the multi-modal query 80 specifying the cybersecurity sensory agent identifier (or AID) 56 associated with the digital cybersecurity service 22 (Block 200). When the multi-modal query specifies the agent point query 88 (Block 202), the computer system 50 determines the single sensory nodal server 52 associated with the digital cybersecurity service 22 that locally stores the cybersecurity query results 86 by mapping the cybersecurity sensory agent identifier 56 to the single sensory nodal server 52 (Block 204). When the multi-modal query 80 specifies the agent fleet query 90 (Block 206), the computer system 50 determines the multiple sensory nodal servers 52 associated with the digital cybersecurity service 22 that each locally store a portion of the cybersecurity query results 86 by mapping the cybersecurity sensory agent identifier 56 to the multiple sensory nodal servers 52 (Block 208). When the multi-modal query specifies neither the agent point query 88 nor the agent fleet query 90 (Block 206), then the standing query 82 is installed by mapping the cybersecurity sensory agent identifier 56 to the single sensory nodal server 52 (Block 210).

Figure 21:
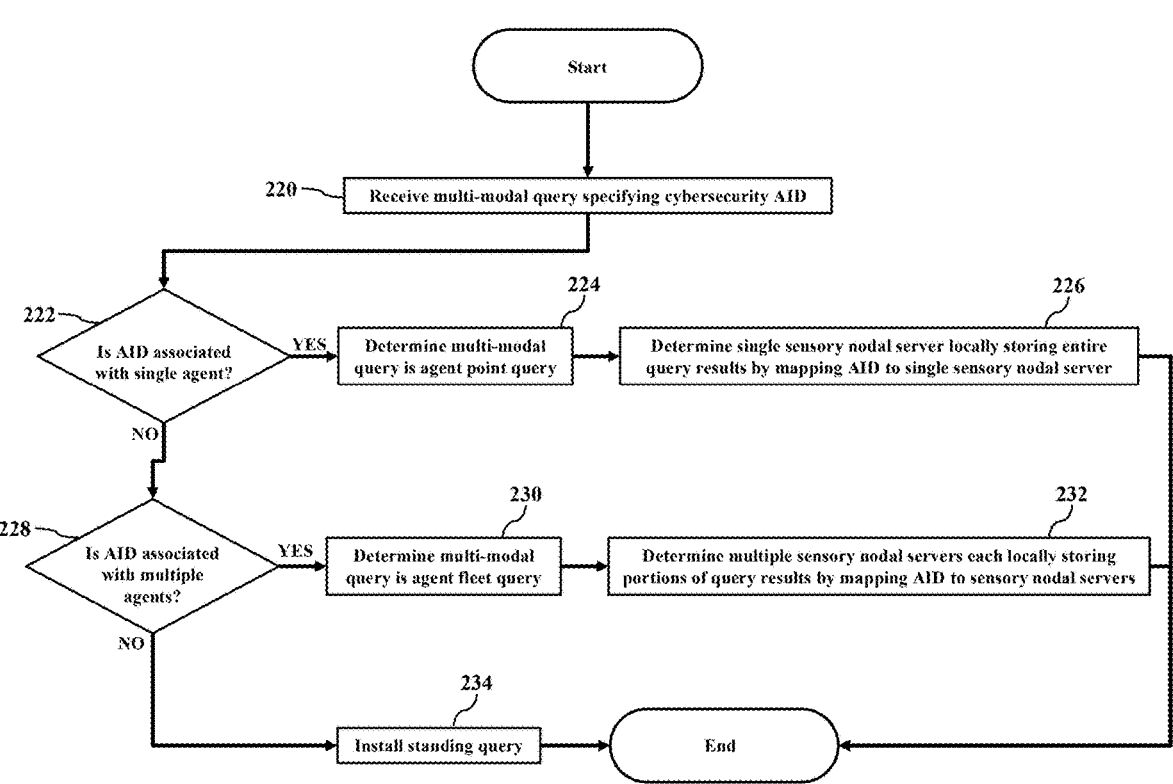

FIG. 21 illustrates more examples of methods or operations that locate the cybersecurity query results 86. The multi-modal query 80 is received that specifying the cybersecurity sensory agent identifier (or AID) 56 (Block 220). When the cybersecurity sensory agent identifier 56 is associated with the single cybersecurity sensory agent 54 (Block 222), then determine the multi-modal query 80 is the agent point query 88 (Block 224) and determine the single dedicated sensory nodal server 52 that locally and entirely stores the cybersecurity query results 86 by mapping the cybersecurity sensory agent identifier 56 to the single sensory nodal server 52 (Block 226). When the cybersecurity sensory agent identifier (or AID) 56 is associated with the multiple cybersecurity sensory agents 54 (Block 228), then determine the multi-modal query 80 is the agent fleet query 90 (Block 230) and determine the multiple dedicated sensory nodal servers 52 that each locally store portions of the cybersecurity query results 86 by mapping the cybersecurity sensory agent identifier (or AID) 56 to the multiple sensory nodal servers 52 (Block 232). When the multi-modal query specifies neither the agent point query 88 nor the agent fleet query 90 (Block 228), then the standing query 82 is installed by mapping the cybersecurity sensory agent identifier (or AID) 56 to the single sensory nodal server 52 (Block 234).

Figure 22:
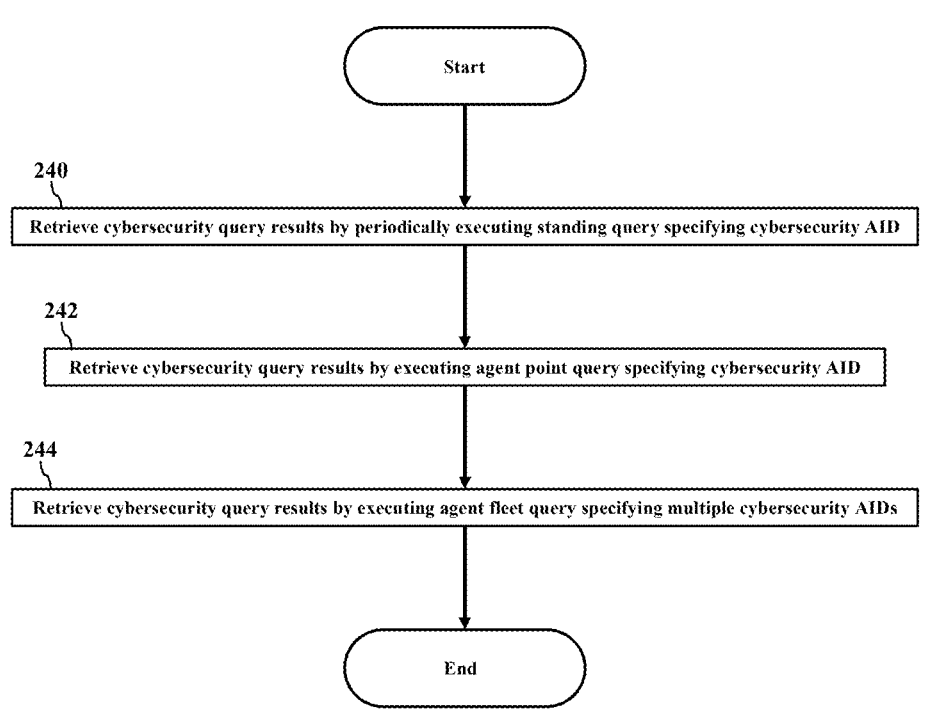
FIG. 22 illustrates examples of methods or operations that retrieve the cybersecurity query results.

FIG. 22 illustrates more examples of methods or operations that retrieve the cybersecurity query results 86. The dedicated sensory nodal server 52 retrieves the cybersecurity query results 86 by periodically executing the standing query 82 specifying the cybersecurity sensory agent identifier 56 (or AID) (Block 240). The dedicated sensory nodal server 52 retrieves the cybersecurity query results 86 by executing the agent point query 88 specifying the cybersecurity sensory agent identifier 56 (or AID) (Block 242). The dedicated sensory nodal server 52 retrieves the cybersecurity query results 86 by executing the agent fleet query 90 specifying multiple cybersecurity sensory agent identifiers (or AIDs) 56 (Block 244).

Figure 23:
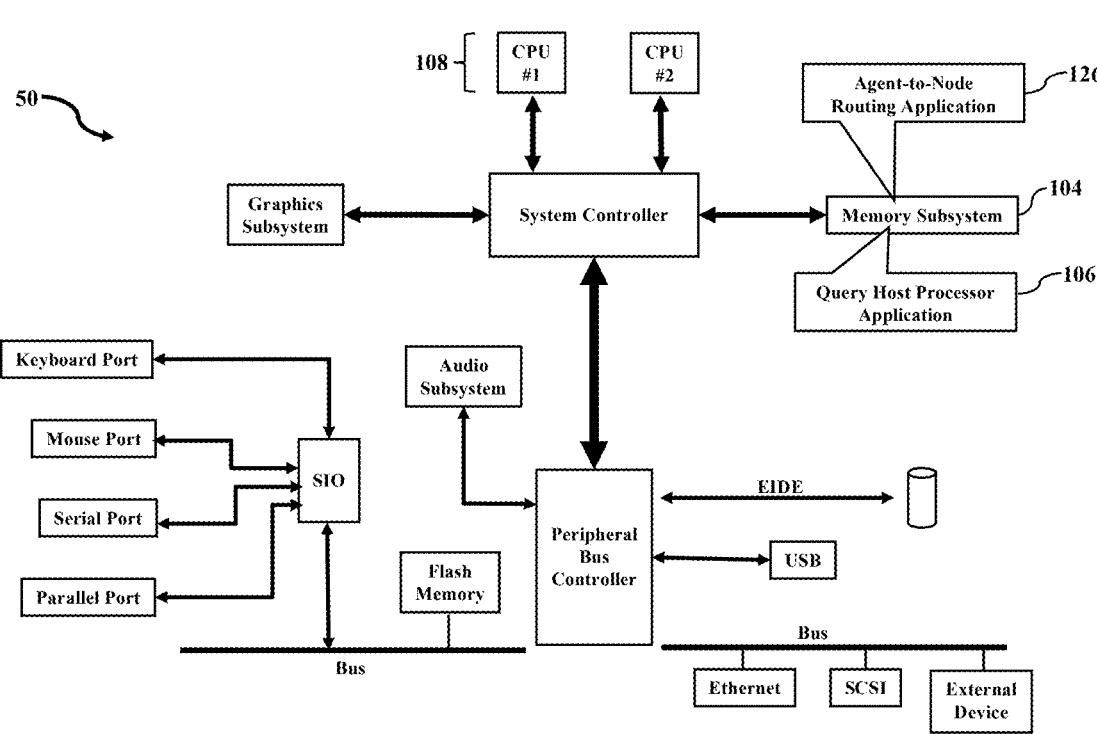
FIG. 23 illustrates a more detailed example of the operating environment.

FIG. 23 illustrates a more detailed example of the operating environment. FIG. 23 is a more detailed block diagram illustrating the computer system 50. The query host processor application 106 and/or the agent-to-node routing application 126 is/are stored in the memory subsystem or device 104. One or more of the hardware processors 108 communicate with the memory subsystem or device 104 and execute the query host processor application 106 and/or the agent-to-node routing application 126. Examples of the memory subsystem or device 104 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology.

The computer system 50 may have any embodiment. This disclosure mostly discusses the computer system 50 as the dedicated sensory nodal server 52 and the agent-to-node server 122. The cybersecurity service 22, however, may be easily adapted to mobile computing, wherein the computer system 50 may be a smartphone, laptop or desktop computer, a switch/router, a tablet computer, or a smartwatch. The cybersecurity service 22 may also be easily adapted to other embodiments of smart devices, such as a television, an audio device, a remote control, and a recorder. The cybersecurity service 22 may also be easily adapted to still more smart appliances, such as washers, dryers, and refrigerators. Indeed, as cars, trucks, and other vehicles grow in electronic usage and in processing power, the cybersecurity service 22 may be easily incorporated into any vehicular controller.

The above examples of the cybersecurity service 22 may be applied regardless of communications networking technology and networking environment. The cybersecurity service 22 may be easily adapted to stationary or mobile devices having wide-area networking (e.g., 4G/LTE/5G/6G cellular), wireless local area networking (WI-FI®), near field, and/or BLUETOOTH® capability. The cybersecurity service 22 may be applied to stationary or mobile devices utilizing any portion of the electromagnetic spectrum and any signaling standard (such as the IEEE 802 family of standards, GSM/CDMA/TDMA or any cellular standard, and/or the ISM band). The cybersecurity service 22, however, may be applied to any processor-controlled device operating in the radio-frequency domain and/or the Internet Protocol (IP) domain. The cybersecurity service 22 may be applied to any processor-controlled device utilizing a distributed computing network, such as the Internet (sometimes alternatively known as the "World Wide Web"), an intranet, a local-area network (LAN), and/or a wide-area network (WAN). The cybersecurity service 22 may be applied to any processor-controlled device utilizing power line technologies, in which signals are communicated via electrical wiring. Indeed, the many examples may be applied regardless of physical componentry, physical configuration, or communications standard(s).

Operating environments may utilize any processing component, configuration, or system. For example, the cybersecurity service 22 may be easily adapted to execute by a desktop, mobile, or server central/graphical processing unit 108 or chipset offered by INTEL®, ADVANCED MICRO DEVICES®, ARM®, APPLE®, TAIWAN SEMICONDUCTOR MANUFACTURING®, QUALCOMM®, or other manufacturer. The computer system 50 may even use multiple central CPUs/GPUs/cores or chipsets, which could include distributed processors or parallel processors in a single machine or multiple machines. The CPUs/GPUs/cores or chipsets can be used in supporting a virtual processing environment. The CPUs/GPUs/cores or chipsets could include a state machine or logic controller. When any of the CPUs/GPUs/cores or chipsets execute instructions to perform "operations," this could include the CPUs/GPUs/cores or chipsets performing the operations directly and/or facilitating, directing, or cooperating with another device or component to perform the operations.

The cybersecurity service 22 may use packetized communications. When the computer system 50 and the cloud computing environment 30 communicate, information may be collected, sent, and retrieved. The information may be formatted or generated as packets of data according to a packet protocol (such as the Internet Protocol). The packets of data contain bytes of data describing the contents, or payload, of a message. A header of each packet of data may be read or inspected and contain routing information identifying an origination address and/or a destination address.

The cybersecurity service 22 may utilize any signaling standard. The cloud computing environment 30 may mostly use wired networks to interconnect the network members 32. However, the cloud computing environment 30 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The cloud computing environment 30 may also utilize other standards, such as the I.E.E.E. 802 family of standards, the Industrial, Scientific, and Medical band of the electromagnetic spectrum, BLUETOOTH®, low-power or near-field, and any other standard or value.

The cybersecurity service 22 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for processing the multi-modal queries 80, as the above paragraphs explain.

The diagrams, schematics, illustrations, and tables represent conceptual views or processes illustrating examples of cloud services malware detection. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A computer-implemented method, comprising:
receiving, by a compute engine located in a security network and executing remotely from one or more client computing devices coupled in communication with the security network, an event stream comprising event data associated with an occurrence of one or more events on the one or more client computing devices;
generating, by the compute engine, new event data based on the event data in the event stream;
receiving, by a predictions engine located in the security network and executing remotely from the one or more client computing devices, the new event data;
selecting, by the predictions engine, one or more of a plurality of machine learning models to which to apply at least a portion of the received new event data, based on contextual information associated with, or content of, the received new event data;
applying, by the predictions engine, the at least the portion of the received new event data to the selected one or more of a plurality of machine learning models;
generating, by the selected one or more of the plurality of machine learning models, a prediction result that indicates whether the occurrence of the one or more events from which the new event data was generated represents one or more target behaviors, responsive to the applying, by the predictions engine, of the at least the portion of the received new event data to the selected one or more of the plurality of machine learning models.

2. The computer-implemented method of claim 1, further comprising receiving, by the compute engine from a compiler of the security network, a configuration that includes a compiled set of executable instructions for processing the event data associated with occurrences of one or more events on or by the one or more client computing devices.

3. The computer-implemented method of claim 1, wherein generating, by the compute engine, the new event data based on the event data in the event stream comprises generating, by the compute engine, a context collection comprising the new event data associated with a context collection format based on the event data in the event stream.

4. The computer-implemented method of claim 3, wherein receiving, by the predictions engine located in the security network and executing remotely from the one or more client computing devices, the new event data comprises receiving, by the predictions engine located in the security network and executing remotely from the one or more client computing devices, the context collection comprising the new event data.

5. The computer-implemented method of claim 4, wherein
selecting, by the predictions engine, the one or more of a plurality of machine learning models to which to apply the at least the portion of the received new event data based on the contextual information associated with the received new event data, comprises selecting, by the predictions engine, the one or more of the plurality of machine learning models to which to apply the at least the portion of the received new event data based on the context collection comprising the received new event data.

6. The computer-implemented method of claim 5, wherein generating, by the selected one or more of the plurality of machine learning models, the prediction result that indicates whether the occurrence of the one or more events from which the new event data was generated represents the one or more target behaviors, responsive to the applying, by the predictions engine, the at least the portion of the received new event data to the selected one or more of the plurality of machine learning models comprises generating, by the selected one or more of the plurality of machine learning models, the prediction result that indicates whether the occurrence of the one or more events from which the new event data was generated represents the one or more target behaviors, responsive to the applying, by the predictions engine, the at least the portion of the received new event data in the received context collection to the selected one or more of the plurality of machine learning models.

7. The computer-implemented method of claim 1, wherein generating, by the compute engine, the new event data based on the event data in the event stream, comprises generating, by the compute engine using at least one of one or more query operations, one or more refinement operations, or one or more composition operations, the new event data based on the event data in the event stream.

8. The computer-implemented method of claim 1, wherein generating, by the selected one or more of the plurality of machine learning models, the prediction result that indicates whether the occurrence of the one or more events from which the new event data was generated represents the one or more target behaviors comprises generating a confidence score associated with the prediction result.

9. The computer-implemented method of claim 1, further comprising transmitting, by the security network, the prediction result to the one or more client computing devices.

10. The computer-implemented method of claim 9, wherein transmitting, by the security network, the prediction result to one or more of the plurality of client computing devices comprises transmitting, by the security network, the prediction result to one or more of the plurality of client computing devices responsive to the prediction result indicating that the occurrence of the one or more events from which the new event data is generated represents the one or more target behaviors.

11. The computer-implemented method of claim 1, further comprising generating behavior detection logic, by the one or more client computing devices, for the one or more client computing devices to execute, responsive to receiving, from the security network, the prediction result.

12. A computer system located in a security network, comprising:

one or more processors executing remotely from one or more client computing devices coupled in communication with the security network;

memory storing computer-executable instructions that, when executed by the one or more processors, cause the one or more processors to perform operations comprising:

receiving an event stream comprising event data associated with an occurrence of one or more events on the one or more client computing devices;

generating new event data based on the event data in the event stream;

selecting one or more of a plurality of machine learning models to which to apply at least a portion of the new event data, based on contextual information associated with, or content of, the new event data;

applying the at least the portion of the new event data to the selected one or more of a plurality of machine learning models;

generating, by the selected one or more of the plurality of machine learning models of the security network, a prediction result that indicates whether the occurrence of the one or more events from which the new event data was generated represents one or more target behaviors, responsive to the applying the at least the portion of the new event data to the selected one or more of the plurality of machine learning models.

13. The computer system of claim 12, wherein generating the new event data based on the event data in the event stream comprises generating a context collection comprising the new event data associated with a context collection format based on the event data in the event stream.

14. The computer system of claim 13, wherein selecting the one or more of a plurality of machine learning models to which to apply the at least the portion of the new event data based on the contextual information associated with the new event data, comprises selecting the one or more of the plurality of machine learning models to which to apply the at least the portion of the new event data based on the context collection comprising the new event data.

15. The computer system of claim 14, wherein generating, by the selected one or more of the plurality of machine learning models, the prediction result that indicates whether the occurrence of the one or more events from which the new event data was generated represents the one or more target behaviors, responsive to the applying the at least the portion of the new event data to the selected one or more of the plurality of machine learning models comprises generating, by the selected one or more of the plurality of machine learning models, the prediction result that indicates whether the occurrence of the one or more events from which the new event data was generated represents the one or more target behaviors, responsive to the applying the at least the portion of the new event data in the context collection to the selected one or more of the plurality of machine learning models.

16. The computer system of claim 12, wherein generating the new event data based on the event data in the event stream, comprises generating through at least one of one or more query operations, one or more refinement operations, or one or more composition operations, the new event data based on the event data in the event stream.

17. One or more non-transitory computer-readable media storing computer-executable instructions for one or more computing elements located in a security network remotely from one or more client computing devices coupled in communication with the security network that, when executed by one or more processors of the one or more computing elements, cause the one or more computing elements to perform operations comprising:

receiving an event stream comprising event data associated with an occurrence of one or more events on one or more client computing devices;

generating new event data based on the event data in the event stream;

selecting one or more of a plurality of machine learning models to which to apply at least a portion of the new event data, based on contextual information associated with, or content of, the new event data;

applying the at least the portion of the new event data to the selected one or more of a plurality of machine learning models;

generating, by the selected one or more of the plurality of machine learning models, a prediction result that indicates whether the occurrence of the one or more events from which the new event data was generated represents one or more target behaviors, responsive to the applying the at least the portion of the new event data to the selected one or more of the plurality of machine learning models.

18. The one or more non-transitory computer-readable media of claim 17, wherein generating the new event data based on the event data in the event stream comprises generating a context collection comprising the new event data associated with a context collection format based on the event data in the event stream.

19. The one or more non-transitory computer-readable media of claim 18, wherein selecting the plurality of machine learning models to which to apply the at least the portion of the new event data based on the contextual information associated with the new event data, comprises selecting the one or more of the plurality of machine learning models to which to apply the at least the portion of the new event data based on the context collection comprising the new event data.

20. The one or more non-transitory computer-readable media of claim 19, wherein generating, by the selected one or more of the plurality of machine learning models of the security network, the prediction result that indicates whether the occurrence of the one or more events from which the new event data was generated represents the one or more target behaviors, responsive to the applying the at least the portion of the new event data to the selected one or more of the plurality of machine learning models, comprises generating, by the selected one or more of the plurality of machine learning models, the prediction result that indicates whether the occurrence of the one or more events from which the new event data was generated represents the one or more target behaviors, responsive to the applying the at least the portion of the new event data in the context collection to the selected one or more 29of the plurality of machine learning models.

* * * * *